United States Patent
Sugio et al.

(10) Patent No.: US 11,647,218 B2
(45) Date of Patent: *May 9, 2023

(54) VIDEO CODING METHOD, VIDEO DECODING METHOD, VIDEO CODING APPARATUS AND VIDEO DECODING APPARATUS

(71) Applicant: Sun Patent Trust, New York, NY (US)

(72) Inventors: Toshiyasu Sugio, Osaka (JP); Takahiro Nishi, Nara (JP); Youji Shibahara, Osaka (JP); Kyoko Tanikawa, Osaka (JP); Hisao Sasai, Osaka (JP); Toru Matsunobu, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 200 days.

This patent is subject to a terminal disclaimer.

(21) Appl. No.: 17/152,042

(22) Filed: Jan. 19, 2021

(65) Prior Publication Data

US 2021/0144396 A1    May 13, 2021

Related U.S. Application Data

(63) Continuation of application No. 16/236,858, filed on Dec. 31, 2018, now Pat. No. 10,931,962, which is a
(Continued)

(51) Int. Cl.
| | |
|---|---|
| *H04N 19/51* | (2014.01) |
| *H04N 19/105* | (2014.01) |
| *H04N 19/159* | (2014.01) |
| *H04N 19/172* | (2014.01) |
| *H04N 19/46* | (2014.01) |
| *H04N 19/90* | (2014.01) |

(52) U.S. Cl.
CPC .......... *H04N 19/51* (2014.11); *H04N 19/105* (2014.11); *H04N 19/159* (2014.11);
(Continued)

(58) Field of Classification Search
None
See application file for complete search history.

(56) References Cited

U.S. PATENT DOCUMENTS

| | | |
|---|---|---|
| 5,515,114 A | 5/1996 | Murata |
| 8,964,845 B2 | 2/2015 | Li et al. |

(Continued)

FOREIGN PATENT DOCUMENTS

| | | |
|---|---|---|
| JP | 7-99657 | 4/1995 |
| JP | 2006-525766 | 11/2006 |

(Continued)

OTHER PUBLICATIONS

"Advanced video coding for generic audiovisual services", ITU-T Recommendation H. 264, Mar. 2010.
(Continued)

*Primary Examiner* — Patricia I Young
(74) *Attorney, Agent, or Firm* — Wenderoth, Lind & Ponack, L.L.P.

(57) ABSTRACT

A moving picture coding method includes: making a determination as to whether or not to code all blocks in a current picture in the skip mode; setting, based on a result of the determination, a first flag indicating whether or not a temporally neighboring block is to be referenced, a value of a parameter for determining a total number of merging candidates, and a second flag for each block included in the current picture, the second flag indicating whether or not the block is to be coded in the skip mode; calculating, as a merging candidate, a neighboring block usable for merging; and coding an index which indicates a merging candidate to be used for coding of the current block and attaching the coded index to a bitstream.

2 Claims, 38 Drawing Sheets

Related U.S. Application Data continuation of application No. 15/854,104, filed on Dec. 26, 2017, now Pat. No. 10,205,959, which is a continuation of application No. 15/252,971, filed on Aug. 31, 2016, now Pat. No. 9,883,196, which is a continuation of application No. 13/875,481, filed on May 2, 2013, now Pat. No. 9,467,698.

(60) Provisional application No. 61/645,812, filed on May 11, 2012.

(52) U.S. Cl.
CPC ........... *H04N 19/172* (2014.11); *H04N 19/46* (2014.11); *H04N 19/90* (2014.11)

(56) References Cited

U.S. PATENT DOCUMENTS

| | | |
|---|---|---|
| 8,982,956 B2 | 3/2015 | Nishitani et al. |
| 2004/0146108 A1 | 7/2004 | Hsia |
| 2005/0047504 A1 | 3/2005 | Sung |
| 2006/0239353 A1 | 10/2006 | De Haan et al. |
| 2008/0273094 A1 | 11/2008 | Kunieda |
| 2009/0190655 A1 | 7/2009 | Shimada et al. |
| 2009/0245350 A1 | 10/2009 | Maruyama et al. |
| 2013/0022124 A1 | 1/2013 | Sekiguchi et al. |
| 2013/0208804 A1 | 8/2013 | Lin et al. |

FOREIGN PATENT DOCUMENTS

| | | |
|---|---|---|
| JP | 2008-005163 | 1/2008 |
| JP | WO2008/041300 | 4/2008 |
| JP | 2008-301475 | 12/2008 |
| WO | 2011/121894 | 10/2011 |

OTHER PUBLICATIONS

Benjamin Bross et al., "High efficiency video coding (HEVC) text specification draft 7", Joint Collaborative Team on Video Coding (JCT-VC) of ITU-T SG16 WP3 and ISO/IEC JTC1/SC29/WG11, JCTVC-I1003_d0, ITU-T, May 10, 2012, pp. 1, 27-49, 66-98, 114-126.

FIG. 4

Case of five_minus_max_num_merge_cand = 0

| Merging block candidate index | Merging block candidate |
|---|---|
| 0 | Neighboring block A (Prediction direction 0, (MvL0_A, RefL0_A)) |
| 1 | Neighboring block B (Prediction direction 1, (MvL1_B, RefL1_B)) |
| 2 | Co-located merging block (Bi-prediction, (MvL0_Col, RefL0_Col), (MvL1_Col, RefL1_Col)) |
| 3 | Neighboring block D (Prediction direction 0, (MvL0_D, RefL0_V)) |
| 4 | Zero vector candidate (mv = (0, 0), refIdx = 0) |

Merging block candidate list size = 5 - five_minus_max_num_merge_cand = 5

FIG. 5

Merging block candidate list size = 2

| Merging block candidate index | Bit sequence assigned |
|---|---|
| 0 | 0 |
| 1 | 1 |

Merging block candidate list size = 3

| Merging block candidate index | Bit sequence assigned |
|---|---|
| 0 | 0 |
| 1 | 10 |
| 2 | 11 |

Merging block candidate list size = 4

| Merging block candidate index | Bit sequence assigned |
|---|---|
| 0 | 0 |
| 1 | 10 |
| 2 | 110 |
| 3 | 111 |

Merging block candidate list size = 5

| Merging block candidate index | Bit sequence assigned |
|---|---|
| 0 | 0 |
| 1 | 10 |
| 2 | 110 |
| 3 | 1110 |
| 4 | 1111 |

FIG. 9

Case of five_minus_max_num_merge_cand = 4

| Merging block candidate index | Merging block candidate |
|---|---|
| 0 | Neighboring block A (Prediction direction 0, (MvL0_A, RefL0_A)) |

Merging block candidate list size = 5 - five_minus_max_num_merge_cand = 1

FIG. 26

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 37

| Corresponding standard | Driving frequency |
|---|---|
| MPEG-4 AVC | 500 MHz |
| MPEG-2 | 350 MHz |
| ⋮ | ⋮ |

# VIDEO CODING METHOD, VIDEO DECODING METHOD, VIDEO CODING APPARATUS AND VIDEO DECODING APPARATUS

TECHNICAL FIELD

The present disclosure relates to a moving picture coding method and a moving picture decoding method.

BACKGROUND ART

Generally, in coding processing of a moving picture, the amount of information is reduced by compression for which temporal redundancy and spatial redundancy in the moving picture is utilized. Generally, a method in which spatial redundancy is utilized is performed by transform into frequency domain, and a method of compression for which temporal redundancy is utilized is performed by coding using prediction between pictures (this prediction is hereinafter referred to as inter prediction). In the inter prediction coding, a current picture is coded using a coded picture preceding or following the current picture in display order as a reference picture. Next, a motion vector is derived by estimating a motion of the current picture with respect to the reference picture. Then, the difference between picture data of the current picture and prediction picture data obtained by motion compensation based on the derived motion vector is calculated to remove temporal redundancy. In the motion estimation, difference values from a current block in the current picture are calculated for blocks in the reference picture, and a block having the smallest difference value in the reference picture is used as a reference block. Then, a motion vector is derived using the current block and the reference block. There is a moving picture coding scheme called H.264 which has already been standardized (see Non Patent Literature 1).

CITATION LIST

Non Patent Literature

[Non Patent Literature 1] ITU-T Recommendation H.264 "Advanced video coding for generic audiovisual services", March 2010

SUMMARY

Technical Problem

In recent years, broadcasting and distribution of content at a high resolution of 4K×2K have been being planned, requiring coding efficiency higher than that of such a moving picture coding scheme already standardized.

In view of this, non-restrictive and exemplary embodiments are described herein to provide a moving picture coding method and a moving picture decoding method by which coding is performed with increased coding efficiency.

Solution to Problem

A moving picture coding apparatus according to an aspect of the present disclosure is a method of merging a prediction direction, a motion vector, and a reference picture index of at least one merging candidate to code a current block, and includes: making a determination as to whether or not to code all blocks in a current picture in the skip mode; setting, based on a result of the determination, a first flag indicating whether or not a temporally neighboring block which is included in a picture different from the current picture and temporally neighbors the current block is to be referenced; setting, based on the result of the determination, a value of a parameter for determining a total number of merging candidates; setting, based on the result of the determination, a second flag for each block included in the current picture, the second flag indicating whether or not the block is to be coded in the skip mode; determining, based on the first flag and the total number of the merging candidates, the at least one merging candidate from among one or more candidates including a neighboring block which is either a block spatially neighboring the current block in a picture including the current block or a temporally neighboring block included in the picture different from the current picture, the determined at least one merging candidate being at least one candidate usable for the merging; selecting a merging candidate to be used for coding of the current block from among the determined at least one merging candidate; and coding an index which indicates the selected merging candidate and attaching the coded index to a bitstream, according to the total number of the merging candidates.

The general or specific aspect can be implemented as a system, a method, an integrated circuit, a computer program, a computer-readable recording medium such as a CD-ROM, or as any combination of a system, a method, an integrated circuit, a computer program, and a computer-readable recording medium.

Additional benefits and advantages of the disclosed embodiments will be apparent from the Specification and Drawings. The benefits and/or advantages may be individually obtained from the various embodiments and features disclosed in the Specification and Drawings, which need not all be provided in order to obtain one or more of such benefits and/or advantages.

Advantageous Effects

With the moving picture coding method and the moving decoding method according to an aspect of the present disclosure, coding of a moving picture can be performed with increased coding efficiency.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 shows an exemplary merging block candidate list.

FIG. 5 shows a relationship between a merging block candidate list size and bit sequences assigned to merging block candidate indices.

FIG. 9 shows an exemplary merging block candidate list according to Embodiment 1.

FIG. 26 illustrates a structure of multiplexed data.

FIG. 37 shows an example of a look-up table in which video data standards are associated with driving frequencies.

DESCRIPTION OF EMBODIMENTS (Underlying Knowledge Forming Basis of the Present Disclosure)

In a moving picture coding scheme referred to as H.264, which is already standardized, three picture types of I-picture, P-picture, and B-picture are used for reduction of the amount of information by compression. The I-picture is not coded by inter prediction coding, that is, is coded by prediction within the picture (this way of prediction is hereinafter referred to as intra prediction). The P-picture is coded using inter prediction with reference to one previously coded picture preceding or following the current picture in display order. The B-picture is coded using inter prediction with reference to two previously coded pictures preceding and following the current picture in display order.

In coding using inter prediction, a reference picture list indicating reference pictures is generated. In the reference picture list, reference picture indices are assigned to coded reference pictures to be referenced in inter prediction. For example, two reference picture lists (L0 and L1) are held for a B-picture because it can be coded with reference to two pictures.

Figure 1:
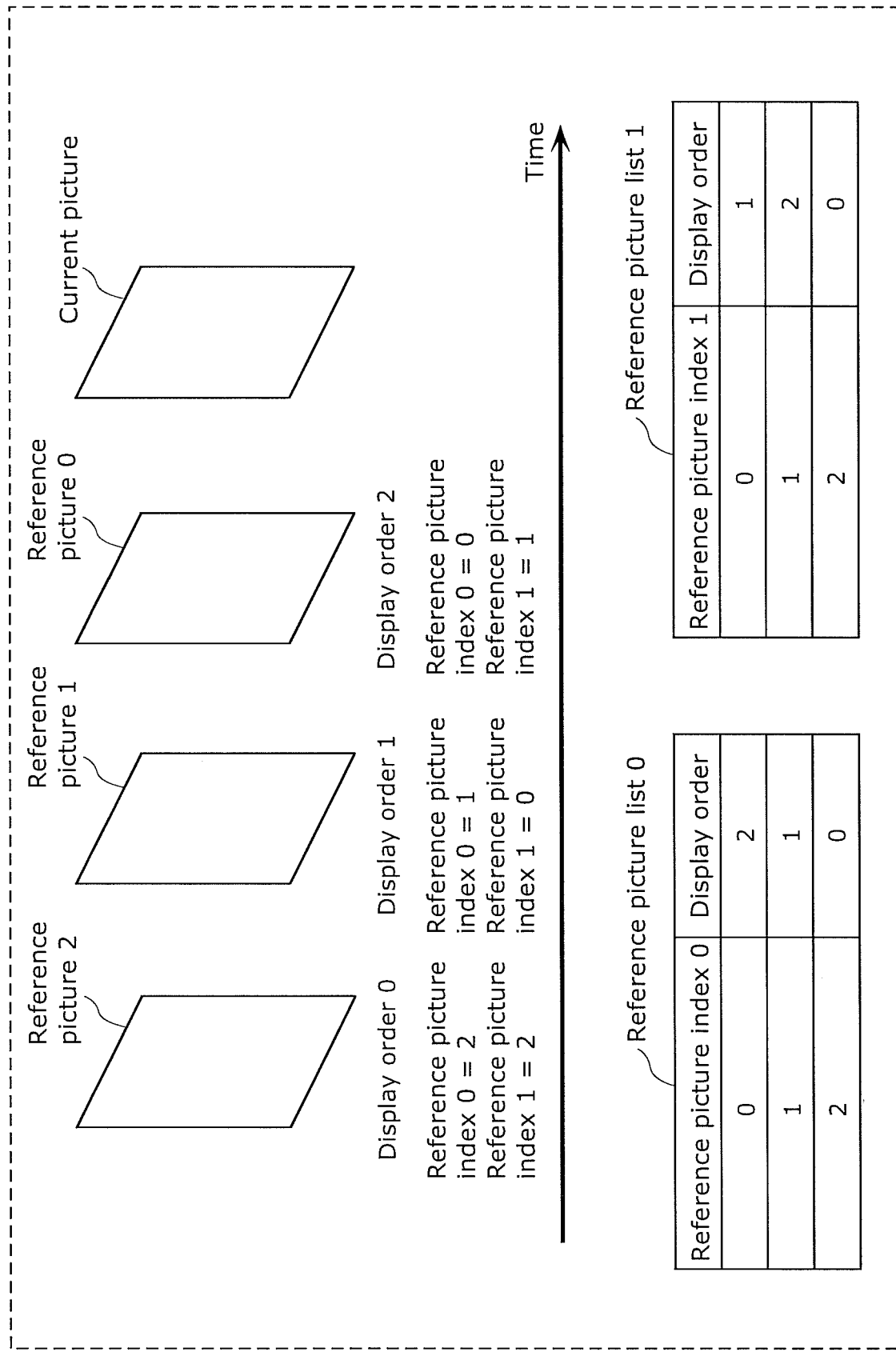
FIG. 1 is a diagram for illustrating exemplary reference picture lists for a B-picture.

FIG. 1 is a diagram for illustrating exemplary reference picture lists for a B-picture. A reference picture list 0 (L0) in FIG. 1 is an exemplary reference picture list for a prediction direction of 0 in bi-prediction. In the reference picture list 0, a reference picture index 0 having a value of 0 is assigned to a reference picture 0 with a display order number 2, a reference picture index 0 having a value of 1 to a reference picture 1 with a display order number 1, and a reference picture index 0 having a value of 2 to a reference picture 2 with a display order number 0. In other words, a reference picture temporally closer to the current picture in display order is assigned with a reference picture index having a smaller value. On the other hand, a reference picture list 1 (L1) in FIG. 1 is an exemplary reference picture list for a prediction direction of 1 in bi-prediction. In the reference picture list 1, a reference picture index 1 having a value of 0 is assigned to a reference picture 1 with a display order number 1, a reference picture index 1 having a value of 1 to a reference picture 0 with a display order number 2, and a reference picture index 2 having a value of 2 to a reference picture 2 with a display order number 0. In this manner, a reference picture may be assigned with reference picture indices having different values between prediction directions (the reference pictures 0 and 1 in FIG. 1) and may be assigned with reference picture indices having the same value for both directions (the reference picture 2 in FIG. 1).

In the moving picture coding method referred to as H.264, there is a motion vector estimation mode available as a coding mode for inter prediction of blocks in a B-picture. In coding in the motion vector estimation mode, a difference value between data of a prediction picture and picture data of a current block and a motion vector used for generating the prediction picture data are coded. In the motion vector estimation mode, bi-prediction and uni-prediction are selectively performed. In the bi-prediction, a prediction picture is generated with reference to two previously coded pictures preceding and following a current picture. In the uni-prediction, a prediction picture is generated with reference to one previously coded picture preceding or following a current picture.

Furthermore, in the moving picture coding method referred to as H.264, a coding mode referred to as a temporal motion vector prediction mode can be selected for derivation of a motion vector in coding of a B-picture.

Figure 2:
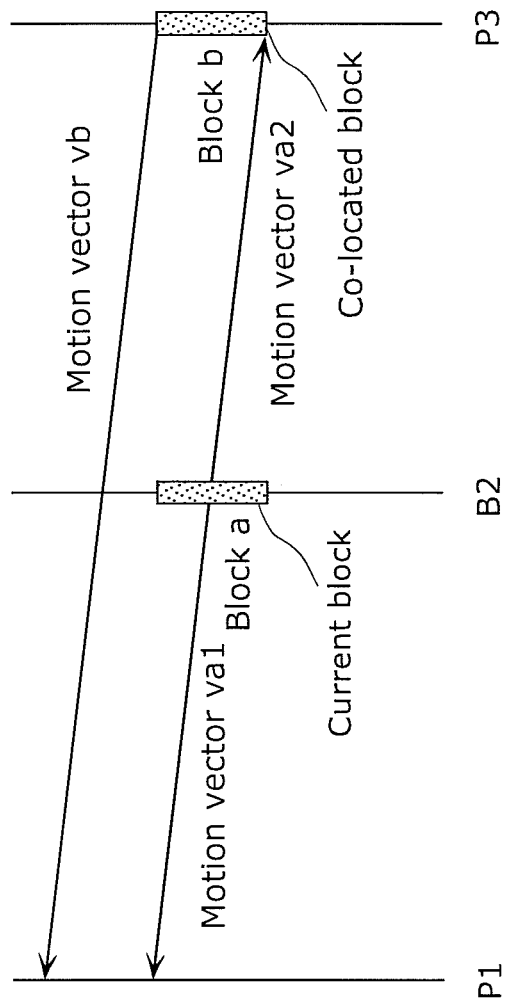
FIG. 2 is a diagram for illustrating an inter prediction coding method performed in a temporal motion vector prediction mode.

FIG. 2 is a diagram for illustrating an inter prediction coding method performed in the temporal motion vector prediction mode. FIG. 2 illustrates motion vectors in the temporal motion vector prediction mode in the case where a block a in a picture B2 is coded in the temporal motion vector prediction mode. In this case, a motion vector vb is used which has already been used for coding of a block b in a picture P3. The picture P3 is a reference picture following the picture B2. The position of the block b in the picture P3 is equivalent to the position of the block a in the picture B2 (the block b is hereinafter referred to as a "co-located block" of the block a). The motion vector vb has already been used for coding the block b with reference to the picture P1. The block a is coded by bi-prediction using reference blocks obtained from a forward reference picture and a backward reference picture, that is, the picture P1 and the picture P3 using motion vectors parallel to the motion vector vb. Specifically, the block a is coded using two motion vector: one is a motion vector vat for the picture P1; and the other is a motion vector vat for the picture P3.

Furthermore, merge mode has been being proposed as an inter prediction mode for coding of each block in a B-picture or a P-picture. In the merge mode, a block is coded using a motion vector and a reference picture index which are copies of those used for coding of a neighboring block of the block. In the coding of the block, the index and others of the neighboring block from which the index and others are copied are attached to a bitstream, so that the motion vector and reference picture index can be selected in decoding of the block.

Figure 3:
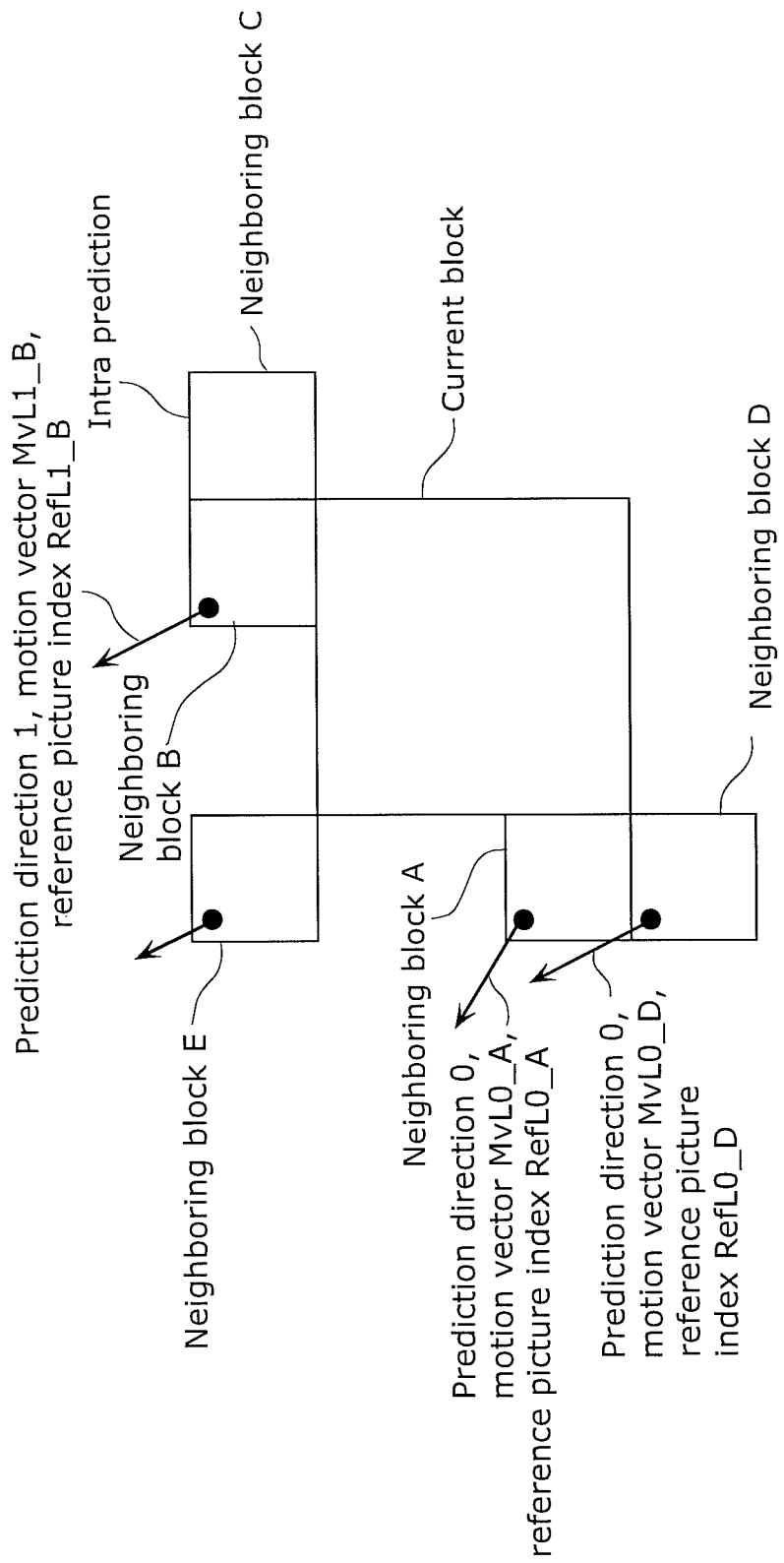
FIG. 3 shows exemplary motion vectors and reference picture indices of a neighboring block for use in merge mode.

FIG. 3 shows exemplary motion vectors and reference picture indices of a neighboring block for use in the merge mode. Referring to FIG. 3, a coded block located to the immediate left of a current block is a neighboring block A. A coded block located immediately above the current block is a neighboring block B. A coded block located immediately above to the right of the current block is a neighboring block C. A coded block located immediately below to the left of the current block is a neighboring block D.

In FIG. 3, the neighboring block A is a block coded by uni-prediction in the prediction direction 0, and has a motion vector MvL0_A for the prediction direction 0 pointing to a reference picture indicated by a reference picture index RefL0_A for the prediction direction 0. The MvL0 is a motion vector pointing to a reference picture indicated in the reference picture list 0 (L0).

The MvL1 is a motion vector pointing to a reference picture indicated in the reference picture list 1 (L1). The neighboring block B is a block coded by uni-prediction in the prediction direction 1, and has a motion vector MvL1_B for the prediction direction 1 pointing to a reference picture indicated by a reference picture index RefL1_B for the prediction direction 1. The neighboring block C is a block coded by intra prediction. The neighboring block D is a block coded by uni-prediction in the prediction direction 0, and has a motion vector MvL0_D for the prediction direction 0 pointing to a reference picture indicated by a reference picture index RefL0_D for the prediction direction 0.

In the case shown in FIG. 3, a set of a motion vector and a reference picture index with which the current block is coded with the highest coding efficiency is selected from among the sets of a motion vector and a reference picture index of the neighboring blocks A, B, C, and D, and the set of a motion vector and a reference picture index calculated using the co-located block for the temporal motion vector prediction mode. Then, a merging block candidate index indicating the selected neighboring block is attached to a bitstream. For example, when the neighboring block A is selected, the current block is coded using the motion vector MvL0_A for the prediction direction 0 and the reference picture index RefL0_A. Then, as shown in FIG. 4, only a value of 0 which is the value of the merging block candidate index indicating the use of the neighboring block A is attached to a bitstream. The amount of information on a motion vector and a reference picture index is thereby reduced.

FIG. 4 shows an exemplary merging block candidate list.

As shown in FIG. 4, in the merge mode, a candidate which cannot be used for merging (hereinafter referred to as a unusable-for-merging candidate) and a candidate having a set of a prediction direction, a motion vector, and a reference picture index identical to that of any other candidate (hereinafter referred to as an identical candidate) are excluded from the merging block candidates. Furthermore, instead of the excluded candidate, a new candidate is added which, for example, is a zero vector candidate. The zero vector candidate is a set of a motion vector of a horizontal component of 0 and a vertical component of zero and a reference picture index having a value of 0. Such increase in the total number of candidates usable for merging increases coding efficiency.

Here, a "candidate unusable for merging" means that (1) the merging block candidate has been coded using intra prediction, (2) the merging block candidate is outside the boundary of the slice or the picture including the current block, or (3) the merging block candidate is yet to be coded. In the example shown in FIG. 4, the neighboring block C is coded using intra picture prediction, and therefore the neighboring block C as a merging block candidate is an unusable-for-merging candidate and is thus excluded from the merging block candidate list. FIG. 4 also shows a parameter five_minus_max_num_merge_cand. This is a parameter for calculation of a merging block candidate list size (the total number of merging block candidates) and is to be attached to a bitstream as a parameter included in header information such as a slice header, a sequence parameter set (SPS), or a picture parameter set (PPS). A merging block candidate list size is calculated by subtracting the value of five_minus_max_num_merge_cand from 5.

FIG. 5 shows a relationship between a merging block candidate list size and bit sequences assigned to merging block candidate indices.

Merging block candidate indices are coded by variable-length coding which is performed by assigning bit sequences to the merging block candidate indices according to the size of each merging block candidate list as shown in FIG. 5. Thus, in the merge mode, the length of a bit sequence assigned to a merging block candidate index depends on a merging block candidate list size so that the amount of code can be reduced.

There is another mode having been proposed as an inter prediction mode for coding of each block in a B-picture or a P-picture. The mode is referred to as skip mode. In the skip mode, a block is coded in the same manner as in the merge mode, using a motion vector and a reference picture index copied from a neighboring block of the block with reference to a merging block candidate list created as shown in FIG. 4. When all resultant prediction errors turn out to be zero for the block, a skip flag is set to have a value of 1, and the skip flag and a merging block candidate index are attached to a bitstream. This is a way how the skip mode has been applied.

However, there is a problem with the conventional skip mode in which a motion vector for a current block to be coded is copied from a motion vector of merging block candidates. For this reason, coding efficiency decreases in the skip mode because motion vectors cannot be settled to zero vectors due to noise even when, for example, consecutive still pictures are coded using inter prediction.

In order to address the problem, provided is a moving picture coding method according to an aspect of the present disclosure which is a method of merging a prediction direction, a motion vector, and a reference picture index of at least one merging candidate to code a current block, and the method includes: making a determination as to whether or not to code all blocks in a current picture in the skip mode; setting, based on a result of the determination, a first flag indicating whether or not a temporally neighboring block which is included in a picture different from the current picture and temporally neighbors the current block is to be referenced; setting, based on the result of the determination, a value of a parameter for determining a total number of merging candidates; setting, based on the result of the determination, a second flag for each block included in the current picture, the second flag indicating whether or not the block is to be coded in the skip mode; determining, based on the first flag and the total number of the merging candidates, the at least one merging candidate from among one or more candidates including a neighboring block which is either a block spatially neighboring the current block in a picture including the current block or a temporally neighboring block included in the picture different from the current picture, the determined at least one merging candidate being at least one candidate usable for the merging; selecting a merging candidate to be used for coding of the current block from among the determined at least one merging candidate; and coding an index which indicates the selected merging candidate and attaching the coded index to a bitstream, according to the total number of the merging candidates.

With this, the first flag, the parameter, and the second flag is set based on a result of the determination as to whether or not all blocks in a current picture is to be coded in the skip mode. This enables settling motion vectors in the skip mode using merging block candidates (merging candidates) to zero vectors. As a result, coding efficiency is increased.

Furthermore, when the determination made in the making of the determination is that all the blocks in the current picture are to be coded in the skip mode, in the setting of the first flag, the first flag may be set to have a value to indicate that the temporally neighboring block is not to be referenced.

Furthermore, when the determination made in the making of the determination is that all the blocks in the current picture are to be coded in the skip mode, in the setting of the value of the parameter, the value of the parameter may be set to cause the total number of the merging candidates to be determined to be one.

Furthermore, when the determination made in the making of the determination is that all the blocks in the current picture are to be coded in the skip mode, in the setting of the second flag, the second flag may be set, for each block in the current picture, to indicate that the block is to be coded in the skip mode.

Furthermore, in the making of the determination, a picture skip flag which indicates the result of the determination may be attached to the bitstream, in the setting of the first flag, the first flag may be set based on the picture skip flag, in the setting of the value of the parameter, the value of the parameter may be set based on the picture skip flag, and in the setting of the second flag, the second flag may be set for each block in the current picture based on the picture skip flag.

Furthermore, in the setting of the first flag, when the picture skip flag indicates that all the blocks in the current picture are to be coded in the skip mode, the first flag may be set to have a value to indicate that the temporally neighboring block of the current block is not to be referenced, and the first flag may not be attached to the bitstream, and when the picture skip flag indicates that not all the blocks in the current picture are to be coded in the skip mode, the first flag may be attached to the bitstream.

Furthermore, in the setting of the value of the parameter, when the picture skip flag indicates that all the blocks in the current picture are to be coded in the skip mode, the value of the parameter may be set to cause the total number of the merging candidates to be determined to be one, and the parameter may not be attached to the bitstream, and when the picture skip flag indicates that not all the blocks in the current picture are to be coded in the skip mode, the parameter may be attached to the bitstream.

Furthermore, when the picture skip flag indicates that all the blocks in the current picture are to be coded in the skip mode, the second flag may be set, for each block in the current picture, to indicate that the block is to be coded in the skip mode, and the second flag may not be attached to the bitstream, and when the picture skip flag indicates that not all the blocks in the current picture are to be coded in the skip mode, the second flag set for each block in the current picture may be attached to the bitstream.

Furthermore, in the coding of the index, when the total number of the merging candidates is one, the attaching of the coded index which indicates the selected merging candidate to the bitstream may be omitted.

In order to address the problem, provided is a moving picture decoding method according to an aspect of the present disclosure which is a method of merging a prediction direction, a motion vector, and a reference picture index of at least one merging candidate to decode a current block, and the method includes: decoding a first flag indicating whether or not a temporally neighboring block which is included in a picture different from the current picture and temporally neighbors the current block is to be referenced; decoding a value of a parameter for determining a total number of merging candidates; decoding a second flag which is set for each block included in the current picture and indicates whether or not the block is to be decoded in the skip mode; determining, based on the first flag and the total number of the merging candidates, the at least one merging candidate from among one or more candidates including a neighboring block which is either a block spatially neighboring the current block in a picture including the current block and or a temporally neighboring block included in the picture different from the current picture, the determined at least one merging candidate being at least one candidate usable for the merging; and decoding, according to the total number of the merging candidates, an index which indicates a merging candidate to be used for decoding of the current block, the merging candidate to be used for decoding of the current block being among the at least one determined merging candidate.

Furthermore, the moving picture decoding method may further include: decoding a picture skip flag which indicates whether or not all blocks in the current picture are to be decoded in the skip mode, wherein in the decoding of the first flag, the first flag may be decoded based on the picture skip flag, in the decoding of the value of the parameter, the value of the parameter may be decoded based on the picture skip flag, in the decoding of the second flag, the second flag set for each block included in the current picture may be decoded based on the picture skip flag.

Furthermore, in the decoding of the first flag, when the picture skip flag has a value of one, the decoding of the first flag may be omitted.

Furthermore, in the decoding of the value of the parameter, when the picture skip flag has a value of one, the decoding of the value of the parameter may be omitted.

Furthermore, in the decoding of the second flag, when the picture skip flag has a value of one, the decoding of the second flag may be omitted.

Furthermore, in the decoding of the index, when the total number of the merging candidates is one, the decoding of the index which indicates the merging candidate to be used for decoding of the current block may be omitted.

These general and specific aspects can be implemented as a system, a method, an integrated circuit, a computer program, a computer-readable recording medium such as a CD-ROM, or as any combination of a system, a method, an integrated circuit, a computer program, and a computer-readable recording medium.

Hereinafter, embodiments will be concretely described with reference to the drawings.

Each of the embodiments described below shows a general or specific example. The numerical values, shapes, materials, constituent elements, the arrangement and connection of the constituent elements, processing steps, the order of the steps etc. shown in the following embodiments are mere examples, and therefore do not limit the scope of claims. Therefore, among the constituent elements in the following exemplary embodiments, constituent elements not recited in an independent claim defining the most generic part of the inventive concept are described as optional constituent elements.

Embodiment 1

Figure 6:
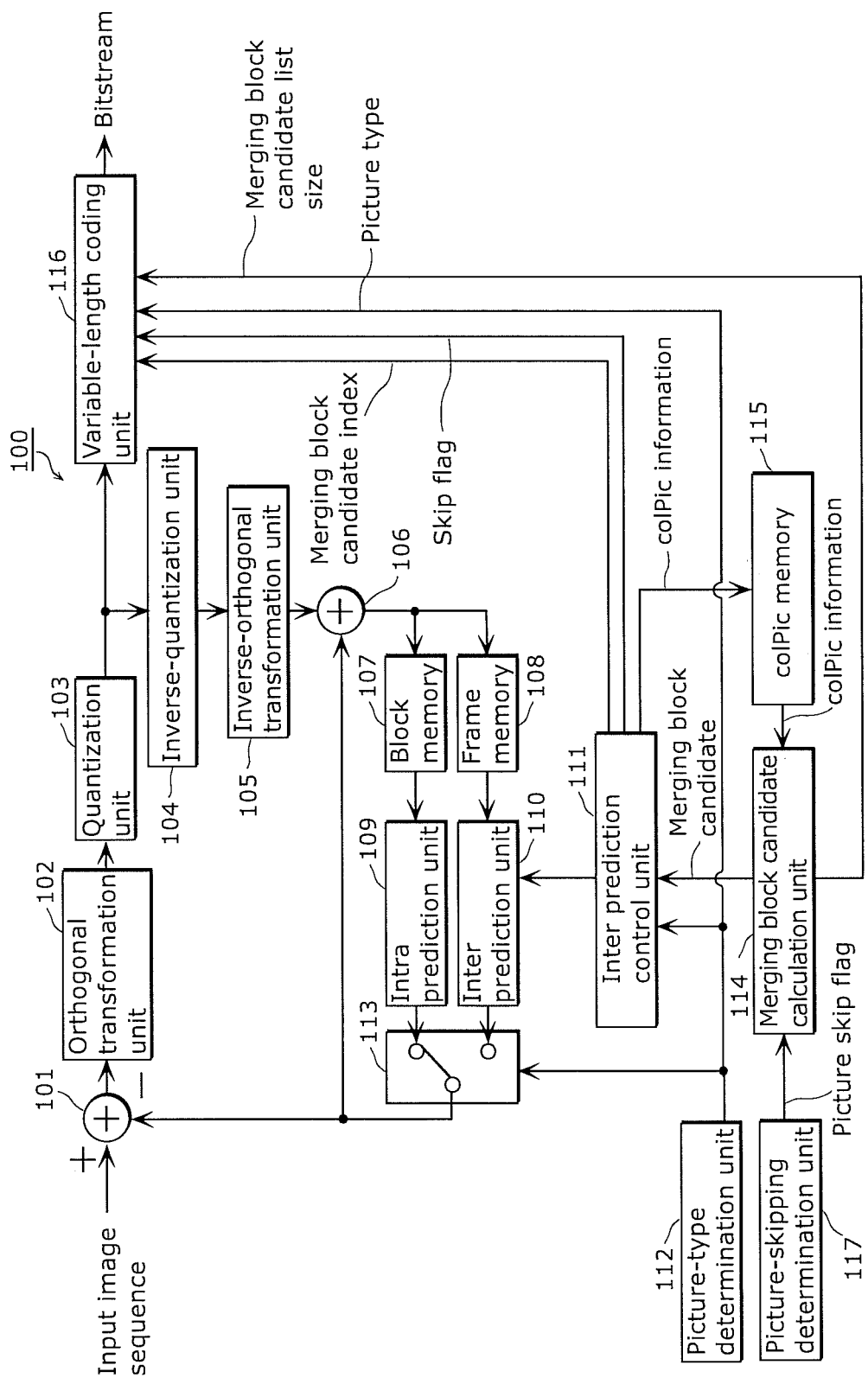
FIG. 6 is a block diagram showing an exemplary configuration of a moving picture coding apparatus in which a moving picture coding method according to Embodiment 1 is used.

FIG. 6 is a block diagram showing a configuration of a moving picture coding apparatus in which a moving picture coding method according to Embodiment 1 is used.

As shown in FIG. 6, the moving picture coding apparatus 100 includes a subtractor 101, an orthogonal transformation unit 102, a quantization unit 103, an inverse-quantization unit 104, an inverse-orthogonal transformation unit 105, an adder 106, block memory 107, frame memory 108, an intra prediction unit 109, an inter prediction unit 110, an inter prediction control unit 111, a picture-type determination unit 112, a switch 113, a merging block candidate calculation unit 114, colPic memory 115, a variable-length coding unit 116, and a picture-skipping determination unit 117.

The subtractor 101 generates prediction error data by subtracting, on a block-by-block basis, prediction image data from input image data included in an input image sequence.

The orthogonal transformation unit 102 transforms the generated prediction error data from picture domain into frequency domain.

The quantization unit 103 quantizes the prediction error data transformed into the frequency domain.

The inverse-quantization unit 104 inverse-quantizes the prediction error data quantized by the quantization unit 103.

The inverse-orthogonal transformation unit 105 transforms the inverse-quantized prediction error data from frequency domain into picture domain.

The adder 106 generates reconstructed image data by adding, on a block-by-block basis, prediction image data and the prediction error data inverse-quantized by the inverse-orthogonal transformation unit 105.

The block memory 107 stores the reconstructed image data in units of a block.

The frame memory 108 stores the reconstructed image data in units of a frame.

The picture-type determination unit 112 determines in which of the picture types of I-picture, B-picture, and P-picture the input image data is to be coded. Then, the picture-type determination unit 112 generates picture-type information indicating the determined picture type.

The intra prediction unit 109 generates intra prediction image data of a current block by performing intra prediction using reconstructed image data stored in the block memory 107 in units of a block.

The inter prediction unit 110 generates inter prediction image data (prediction image) of a current block by performing inter prediction using reconstructed image data stored in the frame memory 108 in units of a frame and a motion vector derived by processing such as motion estimation.

When a current block is coded using intra prediction, the switch 113 outputs, as prediction image data of the current block, intra prediction image data generated by the intra prediction unit 109 to the subtractor 101 and the adder 106. When a current block is coded using inter prediction, the switch 113 outputs, as prediction image data of the current block, inter prediction image data generated by the inter prediction unit 110 to the subtractor 101 and the adder 106.

The picture-skipping determination unit 117 calculates a value of a picture skip flag using a method described later, and outputs the picture skip flag having the calculated value to the merging block candidate calculation unit 114. When the picture skip flag is set to have a value of 1, all blocks in a current picture is coded in the skip mode in which zero vectors are used as motion vectors.

By use of a method described later, the merging block candidate calculation unit 114 derives merging block candidates (merging candidates) for the merge mode and the skip mode, using motion vectors and others of neighboring blocks of a current block and a motion vector and others of a co-located block (colPic information). The colPic information is stored in the colPic memory 115. Furthermore, the merging block candidate calculation unit 114 calculates a merging block candidate list size (the total number of merging candidates). Furthermore, the merging block candidate calculation unit 114 assigns merging block candidate indices to the derived merging block candidates. Then, the merging block candidate calculation unit 114 transmits the merging block candidates and merging block candidate indices to the inter prediction control unit 111. Furthermore, the merging block candidate calculation unit 114 transmits a calculated merging block candidate list size (specifically, five_minus_max_num_merge_cand) to the variable-length coding unit 116.

The inter prediction control unit 111 determines, according to the value of the picture skip flag, whether a current block is to be coded in the skip mode, the motion vector coding mode (motion vector estimation mode), or the merge mode. In the motion vector coding mode, the current block is coded using a motion vector derived by motion estimation. In other words, the inter prediction control unit 111 determines a prediction mode (a coding mode or a prediction coding mode) to be applied to a current block from among the skip mode, motion vector coding mode, and merge mode. Furthermore, when the determined prediction mode is the skip mode, the inter prediction control unit 111 transmits, to the variable-length-coding unit 116, a skip flag (a second flag) indicating whether or not the skip mode is applied and a merging block candidate index corresponding to a determined merging block candidate. Furthermore, the inter prediction control unit 111 transfers colPic information including a motion vector of a current block to the colPic memory 115.

The variable-length coding unit 116 generates a bitstream by performing variable-length coding on the quantized prediction error data, the skip flag, and the picture-type information (picture type). Furthermore, the variable-length coding unit 116 performs variable-length coding on a merging block candidate index to be used in coding, by assigning, to the merging block candidate index, a bit sequence according to a merging block candidate list size.

Figure 7:
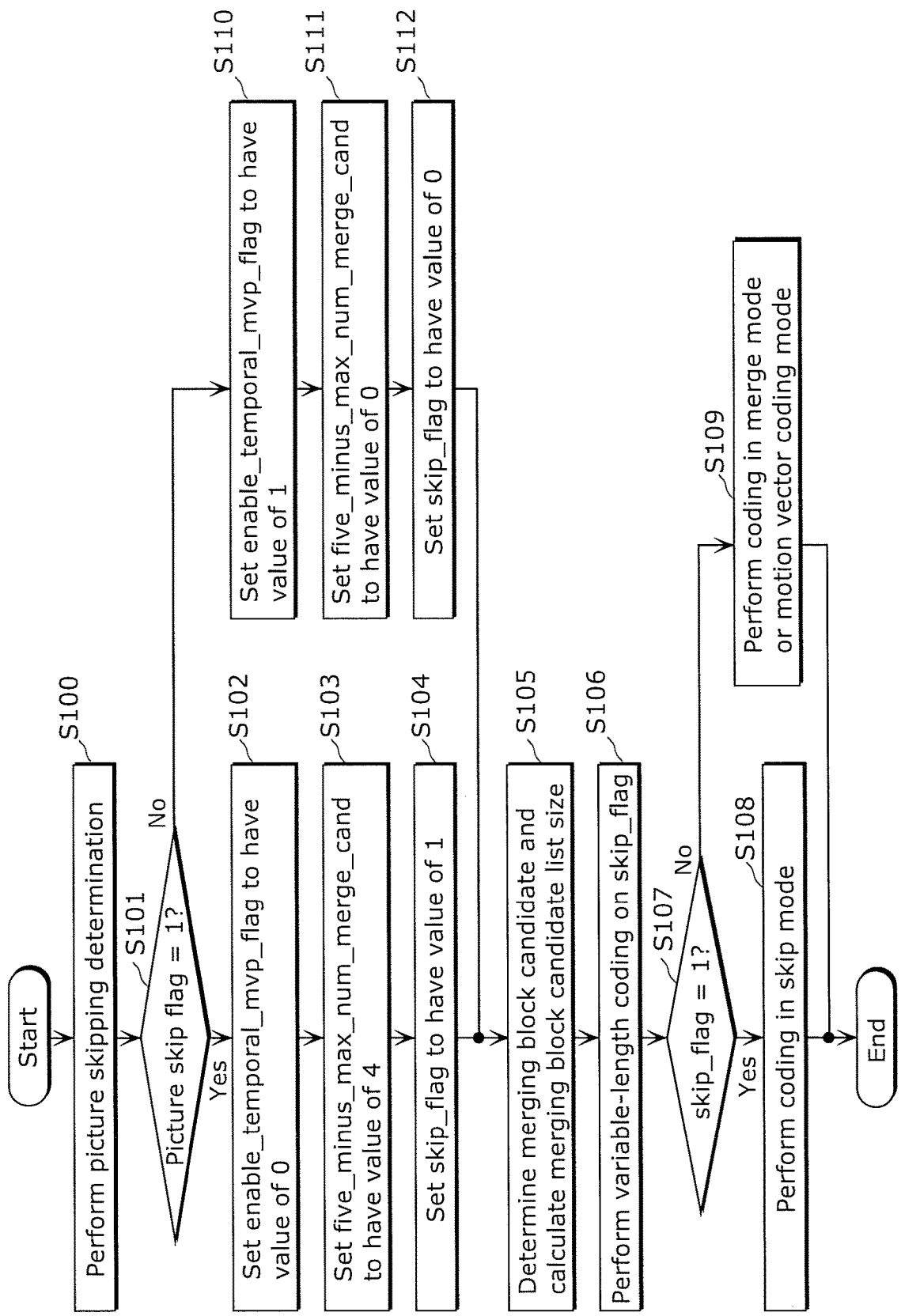
FIG. 7 is a flowchart showing a moving picture coding method performed by the moving picture coding apparatus according to Embodiment 1.

FIG. 7 is a flowchart showing a moving picture coding method performed by the image coding apparatus 100 according to Embodiment 1. First, in S100, a picture skip determination is performed using a method described later to determine the value of a picture skip flag. In S101, whether or not the picture skip flag has a value of 1 is determined. When the result of the determination is true (S101, Yes), enable_temporal_mvp_flag (a first flag) is set to have a value of 0 in S102. The flag of enable_temporal_mvp_flag indicates whether or not a motion vector in the temporal motion vector prediction mode is to be calculated from a motion vector of a co-located block. Then, the flag is attached to header information such as a sequence parameter set (SPS), a picture parameter set (PPS), a slice header, or the like. The flag of enable_temporal_mvp_flag having a value of 1 indicates that a motion vector in the temporal motion vector prediction mode is to be calculated from a motion vector of a co-located block and the co-located block is to be added to a merging block candidate list as a co-located merging block. The flag of enable_temporal_mvp_flag having a value of 0 indicates that a motion vector in the temporal motion vector prediction mode is not to be calculated from a motion vector of a co-located block. In S103, five_minus_max_num_merge_cand is set to have a value of 4, and in S104, the above-described skip_flag is set to have a value of 1.

In this manner, when it is determined in S101 that a picture skip flag has a value of 1, enable_temporal_mvp_flag is set to have a value of 0, five_minus_max_num_merge_cand is set to have a value of 4, and skip_flag is set to have a value of 1.

When the result of the determination in S101 is false (S101, No), enable_temporal_mvp_flag is set to have a value of 1 in S110, five_minus_max_num_merge_cand is set to have a value of 0 in S111, and skip_flag is set to have a value of 0 in S112. In Embodiment 1, the value which five_minus_max_num_merge_cand is set to have in S111 is not limited to 0 and may be set to have a value other than 0.

In S105, by use of a method described later, merging block candidates are generated from neighboring blocks and a co-located block of a current block, and a merging block candidate list size is calculated. For example, in the case shown in FIG. 3, merging block candidates of sets of a motion vector and reference picture index of a current block to be coded are generated from the neighboring block A, B, C, and D and a co-located merging block having a motion vector and others calculated from a motion vector of the co-located block in temporal motion vector prediction mode. When five_minus_max_num_merge_cand has a value of 0, that is, when a merging block candidate list size is 5, each merging block candidate is assigned with a merging block candidate index as shown in as shown in FIG. 4. When five_minus_max_num_merge_cand has a value of 4, that is, when a merging block candidate list size is 1, one merging block candidate is assigned with a merging block candidate index as shown in FIG. 9.

Merging block candidate indices of smaller values are assigned with shorter codes. In other words, the smaller the value of a merging block candidate index is, the smaller the necessary information amount is. On the other hand, the larger the value of a merging block candidate index is, the larger the necessary information amount is. Accordingly, coding efficiency will be increased when merging block candidate indices having smaller values are assigned to merging block candidates which are more likely to be sets of a motion vector and a reference picture index. For example, this can be achieved by counting the total number of times of being selected as a merging block for each merging block candidate and assigning a merging block candidate index having a smaller value to a block with a larger total number of the times. Specifically, this can be achieved by identifying a merging block selected from among neighboring blocks and assigning a merging block candidate index having a smaller value to the identified merging block when a current block is coded.

When a merging block candidate does not have information such as a motion vector, that is, for example, when the merging block is a block coded using intra prediction, the merging block is located outside the boundary of a picture or a slice, or the merging block is yet to be coded), it is determined that the merging block candidate is not usable as a merging block candidate. In Embodiment 1, a merging block candidate unusable as a merging block candidate is referred to as an unusable-for-merging candidate, and a merging block candidate usable as a merging block candidate is referred to as a usable-for-merging candidate. In addition, a merging block candidate sharing a motion vector, a reference picture index, and a prediction direction with any other merging block candidate is referred to as an identical candidate. In the case shown in FIG. 3, the neighboring block C is an unusable-for-merging candidate because it is a block coded using intra prediction.

In S106, skip_flag is coded by variable-length coding. In S107, whether or not skip_flag has a value of 1 is determined. When the result of the determination in S107 is true (S107, Yes), the current block is coded in the skip mode in S108. More specifically, a merging block candidate index of a merging block candidate to be used for generation of a prediction picture in the skip mode is coded by variable-length coding according to a merging block candidate list size. When a merging block candidate list size is 1, the merging block candidate index can be estimated to have a value of 0. In this case, it is possible to attach no merging block candidate index to a bitstream. This will further increase coding efficiency. When the result of the determination in S107 is false (S107, No), in S109, the current block is coded in a prediction coding mode determined based on a result of processing such as comparison between prediction error of an inter prediction image generated using a motion vector derived by motion estimation and prediction error of a prediction picture generated using a merging block candidate in the merge mode. In other words, the current block is coded in the merge mode or the motion vector coding mode.

In Embodiment 1, as exemplified in FIG. 4, the merging block candidate index corresponding to the neighboring block A has a value of 0, the merging block candidate index corresponding to the neighboring block B has a value of 1, the merging block candidate index corresponding to the co-located merging block has a value of 2, and the merging block candidate index corresponding to the neighboring block D has a value of 3. However, assignment of merging block candidate indices is not limited to the example. For example, when a new candidate such as a zero vector candidate is added using a method described later, smaller values may be assigned to preexistent merging block candidates and a larger value to the new candidate so that the preexistent merging block candidates are prioritized. Moreover, the merging block candidates are not limited to the neighboring blocks A, B, C, or D. For example, a neighboring block located above the lower left neighboring block D may be also used as a merging block candidate. Optionally, it is not necessary to use all the neighboring blocks. For example, only the neighboring blocks A and B may be used as merging block candidates.

Moreover, attaching a merging block candidate index to a bitstream in S108 in FIG. 7 is not necessary in Embodiment 1. Optionally, attaching a merging block candidate index may be omitted when a merging block candidate list size is 1. The amount of information on merging block candidate indices is thereby reduced.

The processing step of S100 is performed by the picture-skipping determination unit 117, and the processing steps of S100 to S105 and S110 to S112 by the merging block candidate calculation unit 114, for an example. The processing step of S106 is performed by the variable-length-coding unit 116, and the processing steps of S107 to S109 by a group of constituent elements including the inter prediction unit 110 and the inter prediction control unit 111, for an example.

Figure 8:
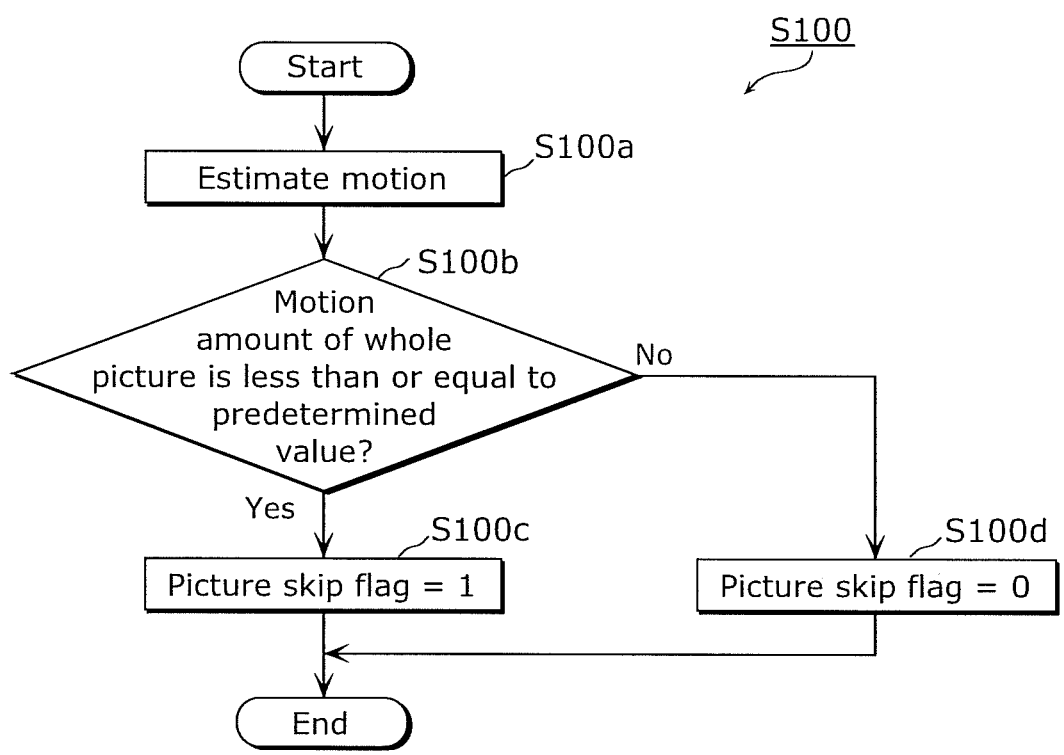
FIG. 8 is a flowchart showing details of processing in Step S100 in FIG. 7.

FIG. 8 is a flowchart showing details of the processing in S100 in FIG. 7. More specifically, this flowchart shows an example of processing for determining the value of a picture skip flag by the picture-skipping determination unit 117 detecting a motion amount of a current picture to be coded. The processing will be described in detail with reference to FIG. 8.

In S100a, a motion amount between whole pictures is estimated by processing such as block-matching between a current picture and a reference picture. The motion amount of a whole picture may be calculated by any method, for example, by calculating from an average value of motion vectors used for coding of a coded picture. In S100b, whether or not the motion amount of a whole picture is below or equal to a predetermined threshold value is determined. When the result of the determination is true (S100b, Yes), the current picture is determined as a picture with less motion, and the picture skip flag is set to have a value of 1 in S100c. When the result of the determination in S100b is false (S100b, No), the picture skip flag is set to have a value of 0 in S100d. A picture skip flag is thus set to have a value according to a motion amount of a whole picture, so that, for example, picture skip flags can be set to have a value of 1 when a current picture is one of consecutive still pictures. Picture skipping is thus performed to increase coding efficiency.

Figure 10:
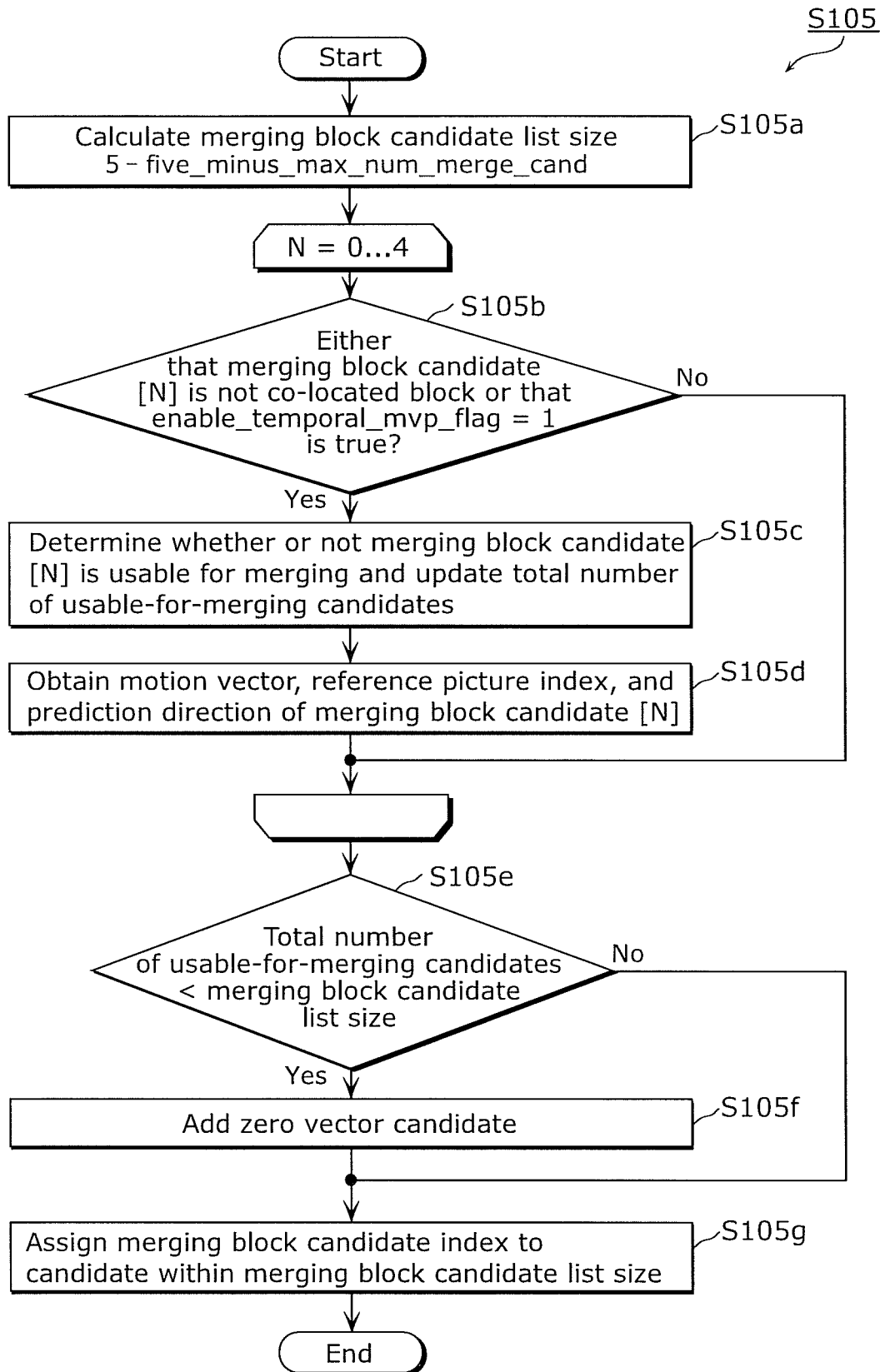
FIG. 10 is a flowchart showing details of processing in Step S105 in FIG. 7.

FIG. 10 is a flowchart showing details of the processing in S105 in FIG. 7. In other words, this flowchart shows a method of calculating merging block candidates and a merging block candidate list size. FIG. 10 will be described below.

In S105a, a merging block candidate list size is calculated using five_minus_max_num_merge_cand. In S105b, it is determined whether it is true either that a merging block candidate [N] is not a co-located merging block or that enable_temporal_mvp_flag has a value of 1. When the result of the determination is true (S105b, Yes), in S105c, whether or not the merging block candidate [N] is usable for merging is determined, and the total number of usable-for-merging candidates is updated. The parameter N denotes an index value to identify a merging block candidate and may have a value from 0 to 4 in Embodiment 1. More specifically, the neighboring block A in FIG. 3 is assigned to a merging block candidate [0], the neighboring block B in FIG. 3 to the merging block candidate [1], a co-located merging block to a merging block candidate [2], the neighboring block C in FIG. 3 to the merging block candidate [3], and the neighboring block D in FIG. 3 to the merging block candidate [4]. Whether or not each merging block candidate [N] is usable for merging is determined by determining whether or not it is true that the merging block candidate [N] is a block coded by intra picture prediction, a block located outside the boundary of a picture or a slice, or a block yet to be coded. When the result of this determination is true, the merging block candidate [N] is determined to be an unusable-for-merging candidate. When the result of this determination is false, the merging block candidate [N] is determined to be a usable-for-merging candidate.

In S105d, a set of a motion vector, a reference picture index, and a prediction direction of the merging block candidate [N] is obtained and added to the merging block candidate list. When the result of the determination in S105b is false, that is, when the merging block candidate [N] is a co-located merging block and enable_temporal_mvp_flag has a value of 0 (S105, No), the merging block candidate [N] is not added to the merging block candidate list.

In S105e, it is determined whether or not the total number of usable-for-merging candidates calculated by iteratively performing the processing steps of S105b to S105d is smaller than the merging block candidate list size. When the result of this determination is true (S105e, Yes), a zero vector candidate is added as a new candidate to the merging block candidates in S105f. Here, the zero vector candidate is a candidate having a motion vector of a horizontal component of 0 and a vertical component of 0 and a reference picture index having a value of 0. In S105g, a merging block candidate index is assigned to a candidate within the merging block candidate list size. Here, when a new candidate is added, merging block candidate indices may be reassigned so that the merging block candidate indices having smaller values are assigned to preexistent merging block candidates. In other words, the preexistent merging block candidates may be prioritized by, for example, assigning a merging block candidate index having a larger value to a new candidate. The amount of codes for merging block candidate indices is thereby reduced.

Figure 11:
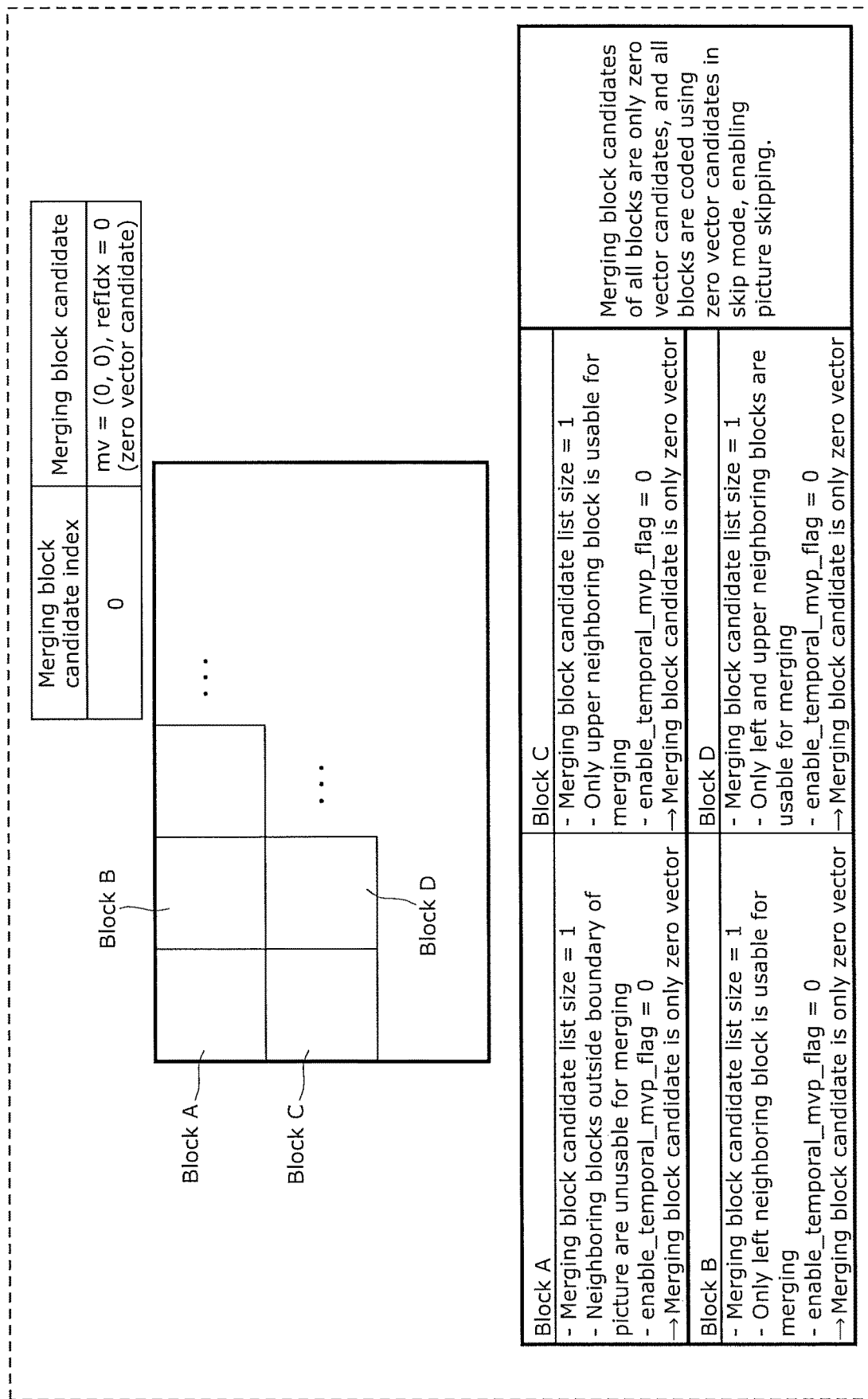
FIG. 11 shows a motion vector of each block for a skip mode when the picture skip flag has a value of 1 according to Embodiment 1.

FIG. 11 shows a motion vector of each block for the skip mode when the picture skip flag has a value of 1. More specifically, FIG. 11 shows an example in which a picture skip flag is set to have a value of 1 in S100 in FIG. 7 and motion vectors of the blocks for the skip mode are calculated according to the flowcharts shown in FIG. 7 and FIG. 10.

In the case of coding of a block A in the upper-left corner of the picture for which the picture skip flag is set to have a value of 1, a merging block candidate list size is 1 and its neighboring blocks are outside the boundary of the picture. Accordingly, all blocks are unusable for merging and enable_temporal_mvp_flag is set to have a value of 0. Thus, only a zero vector candidate is added to the merging block candidate list. As a result, the block A is coded in the skip mode using the zero vector.

In the case of coding of a block B in the uppermost row of the picture for which the picture skip flag is set to have a value of 1, a merging block candidate list size is 1, only a neighboring block left to the current block is usable for merging, and enable_temporal_mvp_flag is set to have a value of 0. Accordingly, only the motion vector of the block A, that is, the zero vector candidate is added to the merging block candidate list. As a result, the block B is coded in the skip mode using the zero vector.

In the case of coding of a block C in the leftmost column of the picture for which the picture skip flag is set to have a value of 1, a merging block candidate list size is 1, only its upper neighboring block is usable for merging, and enable_temporal_mvp_flag is set to have a value of 0. Accordingly, only the motion vector of the block A, that is, the zero vector candidate is added to the merging block candidate list. As a result, the block C is coded in the skip mode using the zero vector.

In the case of coding of a block D for which the picture skip flag is set to have a value of 1, a merging block candidate list size is 1, a neighboring block left to the current block is usable for merging, and enable_temporal_mvp_flag is set to have a value of 0. Accordingly, only the motion vector of the block C, that is, the zero vector candidate is added to the merging block candidate list. As a result, the block D is coded in the skip mode using the zero vector.

In this manner, when the picture skip flag has a value of 1, enable_temporal_mvp_flag is set to have a value of 0, the five_minus_max_num_merge_cand is set to have a value of 4 (the merging block candidate list size to a value of 1), and skip_flag is set to have a value of 1 so that all the blocks in the picture can be coded using a zero vector in the skip mode.

In this manner, according to Embodiment 1, a picture skip flag is set to have a value of 1 so that all blocks in a picture can be coded in the skip mode using a zero vector. This will increase coding efficiency especially for consecutive still pictures. More specifically, when a picture skip flag has a value of 1, setting enable_temporal_mvp_flag to have a value of 0 and skip_flag to have a value of 1 enables coding all blocks in a picture in the skip mode using a zero vector. Furthermore, setting five_minus_max_num_merge_cand to have a value of 4 (the merging block candidate list size to have a value of 1) makes sending of a merging block candidate index unnecessary, so that coding efficiency in picture skipping can be increased.

In Embodiment 1, five_minus_max_num_merge_cand is set to have a value of 4 (a merging block candidate list size is set to have a value of 1) and a zero vector candidate among merging block candidates is used so that all blocks in a picture are coded using the zero vector candidate in the skip mode, which is not limiting the present invention. For example, five_minus_max_num_merge_cand is set to have a value of 5 (a merging block candidate list size is set to have a value of 0). In this case where a merging block candidate list size is 0, coding is performed in the skip mode using a zero vector so that no merging block candidate is calculated. Coding may be thus performed on all blocks in a picture in the skip mode using a zero vector while computational complexity is reduced.

In Embodiment 1, the merge mode is used in which a current block is coded using a motion vector and a reference picture index copied from a neighboring block of a current block, which is not limiting the present invention. For example, a motion vector in the motion vector estimation mode may be coded using a merging block candidate list created as shown in FIG. 9. More specifically, a difference may be calculated by subtracting a motion vector of a merging block candidate indicated by a merging block candidate index from a motion vector in the motion vector estimation mode, and the difference and a merging block candidate index may be attached to a bitstream. Alternatively, a difference may be calculated by scaling a motion vector MV_Merge of a merging block candidate using a reference picture index RefIdx_ME in the motion vector estimation mode and a reference picture index RefIdx_Merge of the merging block candidate and subtracting a motion vector scaledMV_Merge of the merging block candidate obtained by the scaling from the motion vector in the motion vector estimation mode, and the difference and a merging block candidate index may be attached to a bitstream. EQ. 1 shown below is an exemplary formula for the scaling.

$$\text{scaledMV\_Merge} = \text{MV\_Merge} \times (\text{POC}(\text{RefIdx\_ME}) - \text{curPOC})/(\text{POC}(\text{RefIdx\_Merge}) - \text{curPOC}) \quad \text{(EQ. 1)}$$

Here, POC (RefIdx_ME) denotes the display order of a reference picture indicated by a reference picture index RefIdx_ME. POC (RefIdx_Merge) denotes the display order of a reference picture indicated by a reference picture index RefIdx_Merge. curPOC denotes the display order of a current picture to be coded.

Embodiment 2

Figure 12:
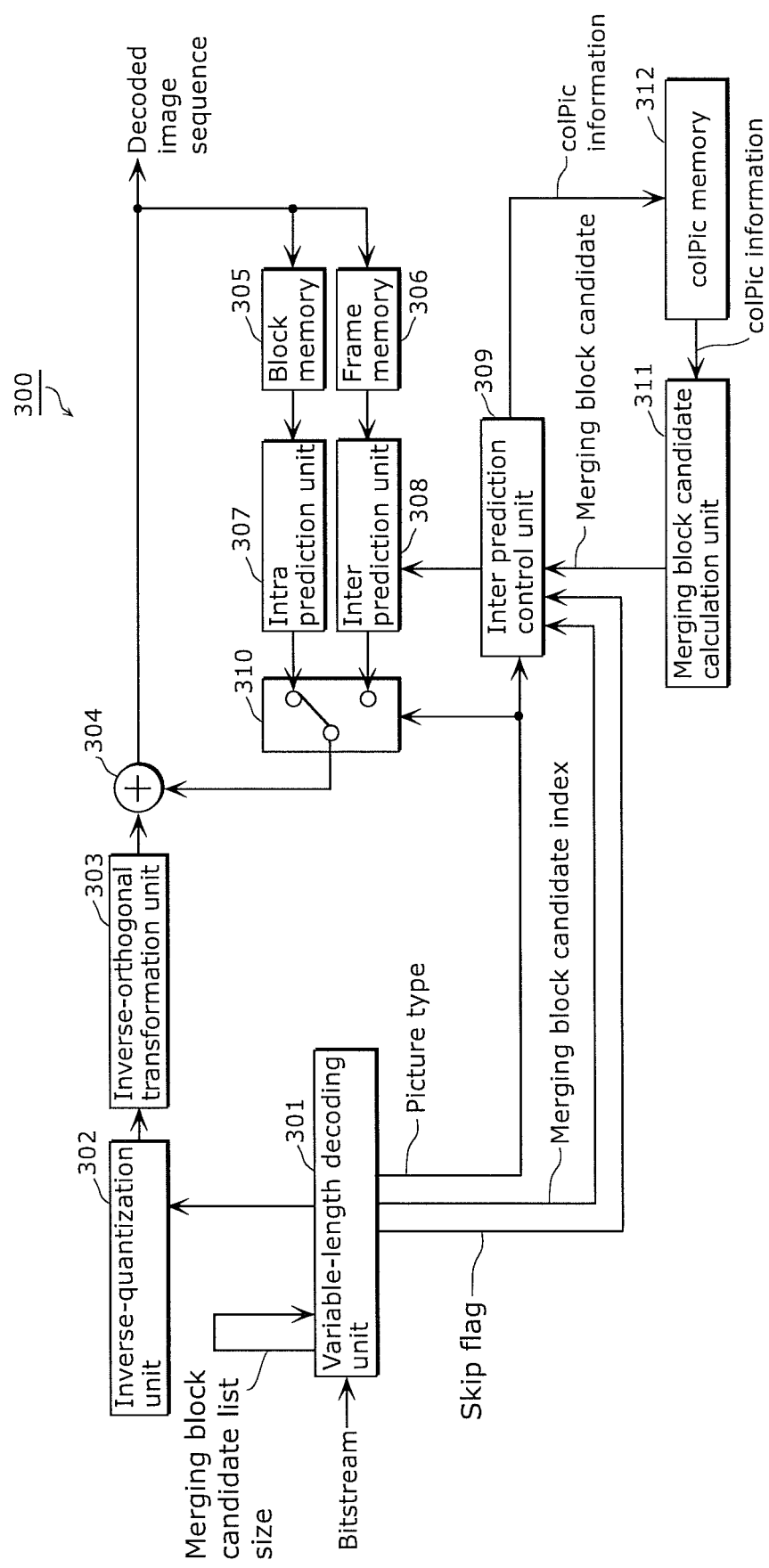
FIG. 12 is a block diagram showing an exemplary configuration of a moving picture decoding apparatus in which a moving picture decoding method according to Embodiment 2 is used.

FIG. 12 is a block diagram showing an exemplary configuration of a moving picture decoding apparatus in which a moving picture decoding method according to Embodiment 2 is used.

For example, the moving picture decoding apparatus 300 decodes, on a block-by-block basis, coded images included in a bitstream generated by the moving picture coding apparatus 100 according to Embodiment 1. As shown in FIG. 12, the moving picture decoding apparatus 300 includes a variable-length decoding unit 301, an inverse-quantization unit 302, an inverse-orthogonal transformation unit 303, an adder 304, block memory 305, frame memory 306, an intra prediction unit 307, an inter prediction unit 308, an inter prediction control unit 309, a switch 310, a merging block candidate calculation unit 311, and col Pic memory 312.

The variable-length decoding unit 301 obtains picture-type information (picture type), a skip flag, a merging block candidate list size (specifically, five_minus_max_num_merge_cand), and a quantized coefficient by performing variable-length decoding on an input bitstream. Furthermore, the variable-length decoding unit 301 performs variable-length decoding on a merging block candidate index using a merging block candidate list size.

The inverse-quantization unit 302 inverse-quantizes the quantized coefficient obtained by the variable-length decoding.

The inverse-orthogonal transformation unit 303 generates prediction error data by transforming an orthogonal transform coefficient obtained by the inverse quantization from frequency domain into picture domain.

The block memory 305 stores, in units of a block, a decoded image sequence generated by adding the prediction error data and prediction image data.

The frame memory 306 stores a decoded image sequence in units of a frame.

The intra prediction unit 307 generates prediction image data of a current block to be decoded, by performing intra prediction using the decoded image sequence stored in the block memory 305 in units of a block.

The inter prediction unit 308 generates inter prediction image data (prediction image) of a current block to be decoded, by performing inter prediction using the decoded image sequence stored in the frame memory 306 in units of a frame.

When a current block is decoded by intra prediction decoding, the switch 310 outputs, as prediction image data of the current block, intra prediction image data generated by the intra prediction unit 307 to the adder 304. When a current block is decoded by inter prediction decoding, the switch 310 outputs, as prediction image data of the current block, inter prediction image data generated by the inter prediction unit 308 to the adder 304.

The merging block candidate calculation unit 311 calculates a merging block candidate list size using a method described later and derives merging block candidates for merge mode and skip mode using motion vectors and others of neighboring blocks of a current block and a motion vector and others of a co-located block (colPic information) of the current block stored in the colPic memory. Furthermore, the merging block candidate calculation unit 311 assigns merging block candidate indices to the derived merging block candidates, and transmits the merging block candidates and merging block candidate indices to the inter prediction control unit 309.

When the skip flag decoded has a value of "0", the inter prediction control unit 309 causes the inter prediction unit 308 to generate an inter prediction image using information for motion vector estimation mode or merge mode. When the skip flag has a value of "1", the inter prediction control unit 309 determines, based on a decoded merging block candidate index, a motion vector, a reference picture index, and a prediction direction for use in inter prediction from a plurality of merging block candidates. Then, the inter prediction control unit 309 causes the inter prediction unit 308 to generate an inter prediction image using the determined motion vector, reference picture index, and prediction direction. Furthermore, the inter prediction control unit 309 transfers colPic information including the motion vector of the current block to the colPic memory 312.

Finally, the adder 304 generates a decoded image sequence by adding prediction image data and prediction error image data.

Figure 13:
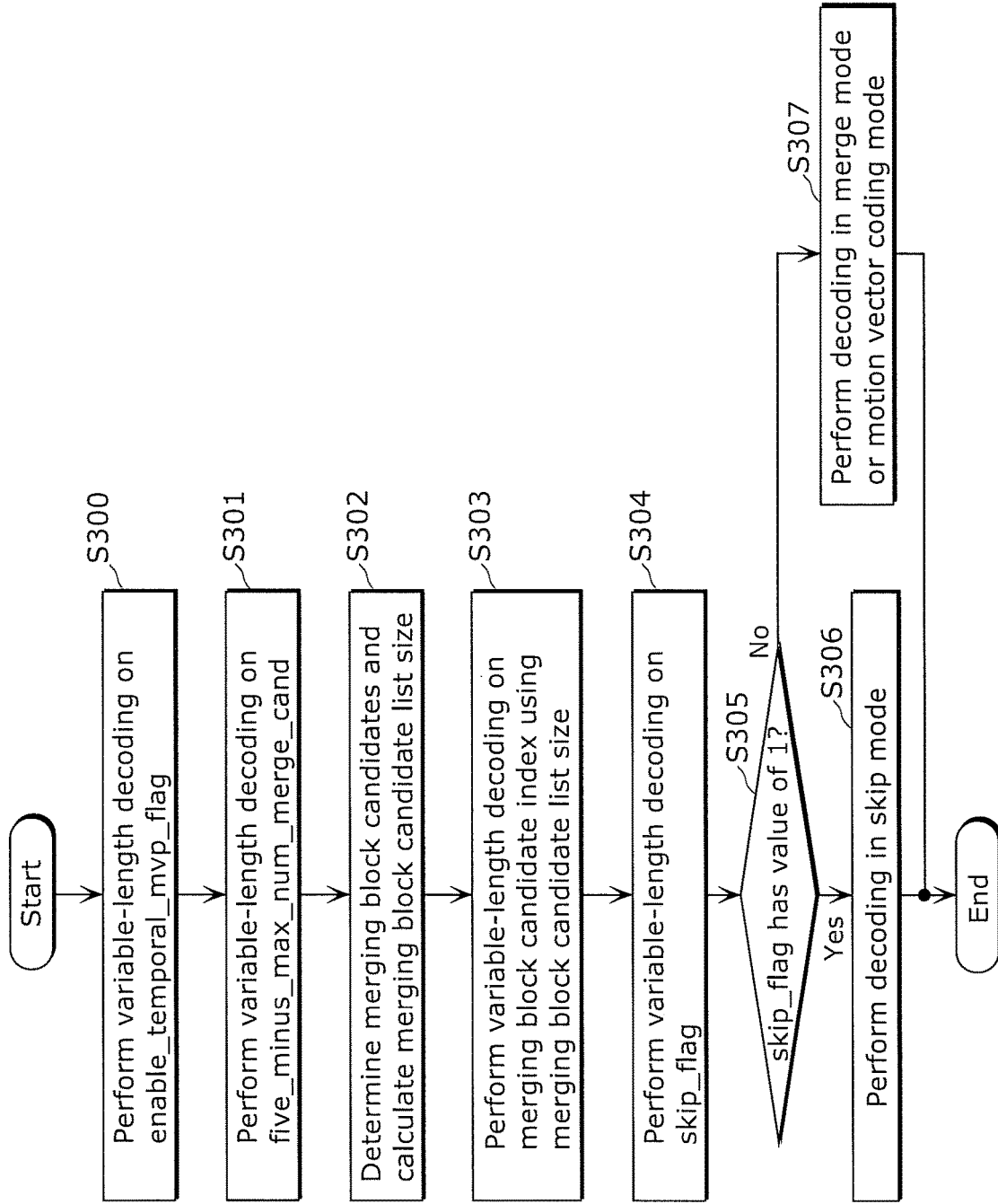
FIG. 13 is a flowchart showing a moving picture decoding method performed by the moving picture decoding apparatus according to Embodiment 2.

FIG. 13 is a flowchart showing a moving picture decoding method performed by the moving picture decoding apparatus 300 according to Embodiment 2. First, in S300, enable_temporal_mvp_flag is decoded, and then, in S301 five_minus_max_num_merge_cand is decoded. In S302, a method as shown in FIG. 10 is performed to calculate a merging block candidate list size and generate merging block candidates from neighboring blocks and a co-located block of a current block to be decoded. In S303, variable-length decoding is performed on a merging block candidate index included in a bitstream using the calculated merging block candidate list size. When the merging block candidate list size is 1, the merging block candidate index may be estimated to have a value of 0 without decoding a merging block candidate index. In S304, decoding is performed on skip_flag in a bitstream. In S305, whether or not skip_flag has a value of 1 is determined. When the result of the determination in S305 is true (S305, Yes), in S306, an inter prediction picture is generated in the skip mode using a motion vector, a reference picture index, and a prediction direction of a merging block candidate indicated by a merging block candidate index. In other words, the current block is decoded in the skip mode. When the result of the determination in S305 is false (S305, No), in S307, an inter prediction picture is generated using information for merge mode or motion vector coding mode. In other words, the current block is decoded in the merge mode or the motion vector coding mode.

The processing steps of S300, S301, S303, and S304 are performed by the variable-length decoding unit 301, and the processing step of S303 by the merging block candidate calculation unit 311, for an example. The processing steps of S305 to S307 are performed by a group of constituent elements including the inter picture prediction control unit 309 and the inter prediction unit 308, for an example.

Figure 14:
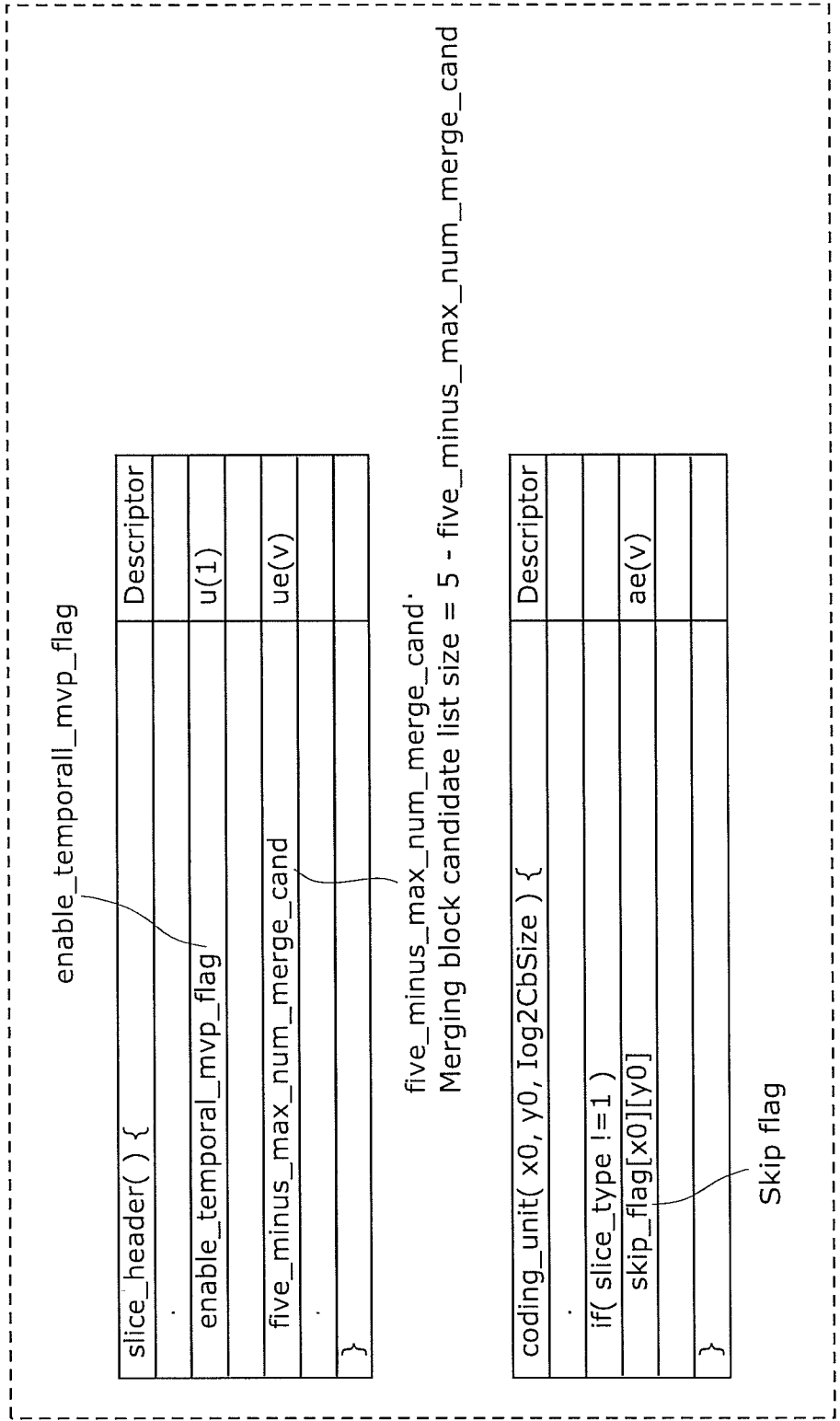
FIG. 14 shows exemplary syntax according to Embodiment 2.

FIG. 14 shows exemplary syntax according to Embodiment 2. Specifically, the syntax is used for attaching enable_temporal_mvp_flag, five_minus_max_num_merge_cand and skip_flag to a bitstream.

In this manner, according to Embodiment 2, a picture skip flag is set to have a value of 1 so that it is possible to appropriately decode a bitstream generated by coding all blocks in a picture in the skip mode using a zero vector, especially a bitstream of consecutive still pictures coded with increased coding efficiency. More specifically, when a picture skip flag has a value of 1, enable_temporal_mvp_flag is set to have a value of 0 and skip_flag is set to have a value of 1. By using this setting, it is possible to appropriately decode a bitstream generated by coding all blocks in a picture in the skip mode using a zero vector. Furthermore, when five_minus_max_num_merge_cand is set to have a value of 4 (the merging block candidate list size is set to have a value of 1), a merging block candidate index need not be transmitted by the moving picture coding apparatus 100. Thus, the moving picture decoding apparatus 300 in Embodiment 2 can appropriately decode a bitstream coded with increased coding efficiency for picture skipping.

Embodiment 3

Figure 15:
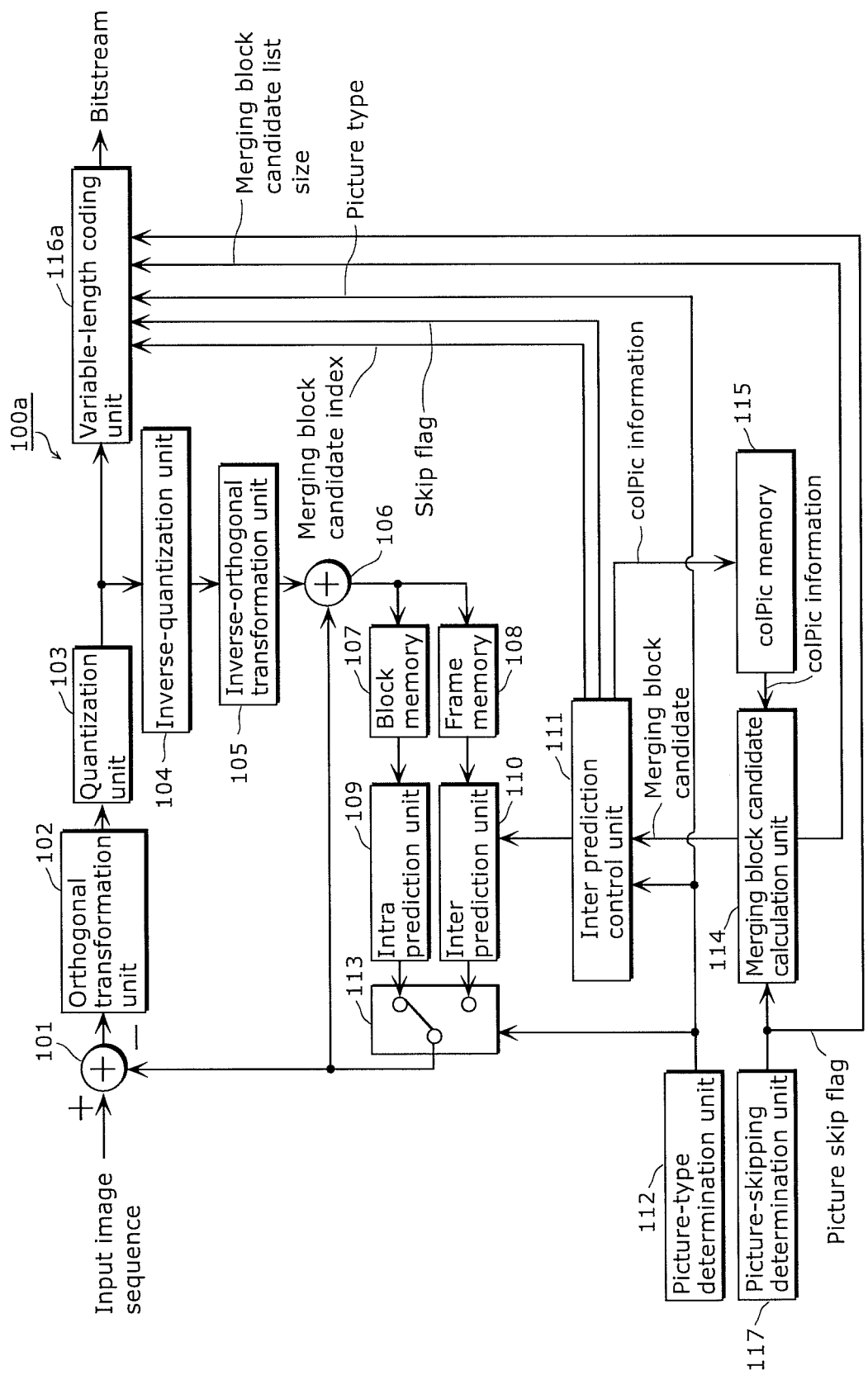
FIG. 15 is a block diagram showing an exemplary configuration of a moving picture coding apparatus in which a moving picture coding method according to Embodiment 3 is used.

FIG. 15 is a block diagram showing a configuration of a moving picture coding apparatus in which a moving picture coding method according to Embodiment 3 is used. Embodiment 3 is different from Embodiment 1 only in that a picture skip flag is attached to a bitstream, and therefore description of the other points is omitted.

As shown in FIG. 15, the moving picture coding apparatus 100a includes a subtractor 101, an orthogonal transformation unit 102, a quantization unit 103, an inverse-quantization unit 104, an inverse-orthogonal transformation unit 105, an adder 106, block memory 107, frame memory 108, an intra prediction unit 109, an inter prediction unit 110, an inter prediction control unit 111, a picture-type determination unit 112, a switch 113, a merging block candidate calculation unit 114, colPic memory 115, a variable-length coding unit 116a, and a picture-skipping determination unit 117.

The picture-skipping determination unit 117 calculates a value of a picture skip flag using a method as shown in FIG. 8. When the picture skip flag has a value of 1, all blocks in a current picture is coded in the skip mode in which zero vectors are used as motion vectors. The picture-skipping determination unit 117 outputs the picture skip flag having the calculated value to the merging block candidate calculation unit 114 and the variable-length-coding unit 116a.

By use of a method described later, the merging block candidate calculation unit 114 derives merging block candidates for the merge mode and the skip mode using motion vectors and others of neighboring blocks of a current block and a motion vector and others of the co-located block (colPic information) stored in the colPic memory 115. Furthermore, the merging block candidate calculation unit 114 calculates a merging block candidate list size. Furthermore, the merging block candidate calculation unit 114 assigns merging block candidate indices to the derived merging block candidates. Then, the merging block candidate calculation unit 114 transmits the merging block candidates and merging block candidate indices to the inter prediction control unit 111. Furthermore, the merging block candidate calculation unit 114 transmits the calculated merging block candidate list size to the variable-length coding unit 116a.

The variable-length-coding unit 116a performs variable-length coding not only on a skip flag, a merging block candidate index, picture type, and the merging block candidate list size (specifically five_minus_max_num_merge_cand) but also on a picture skip flag.

Figure 16:
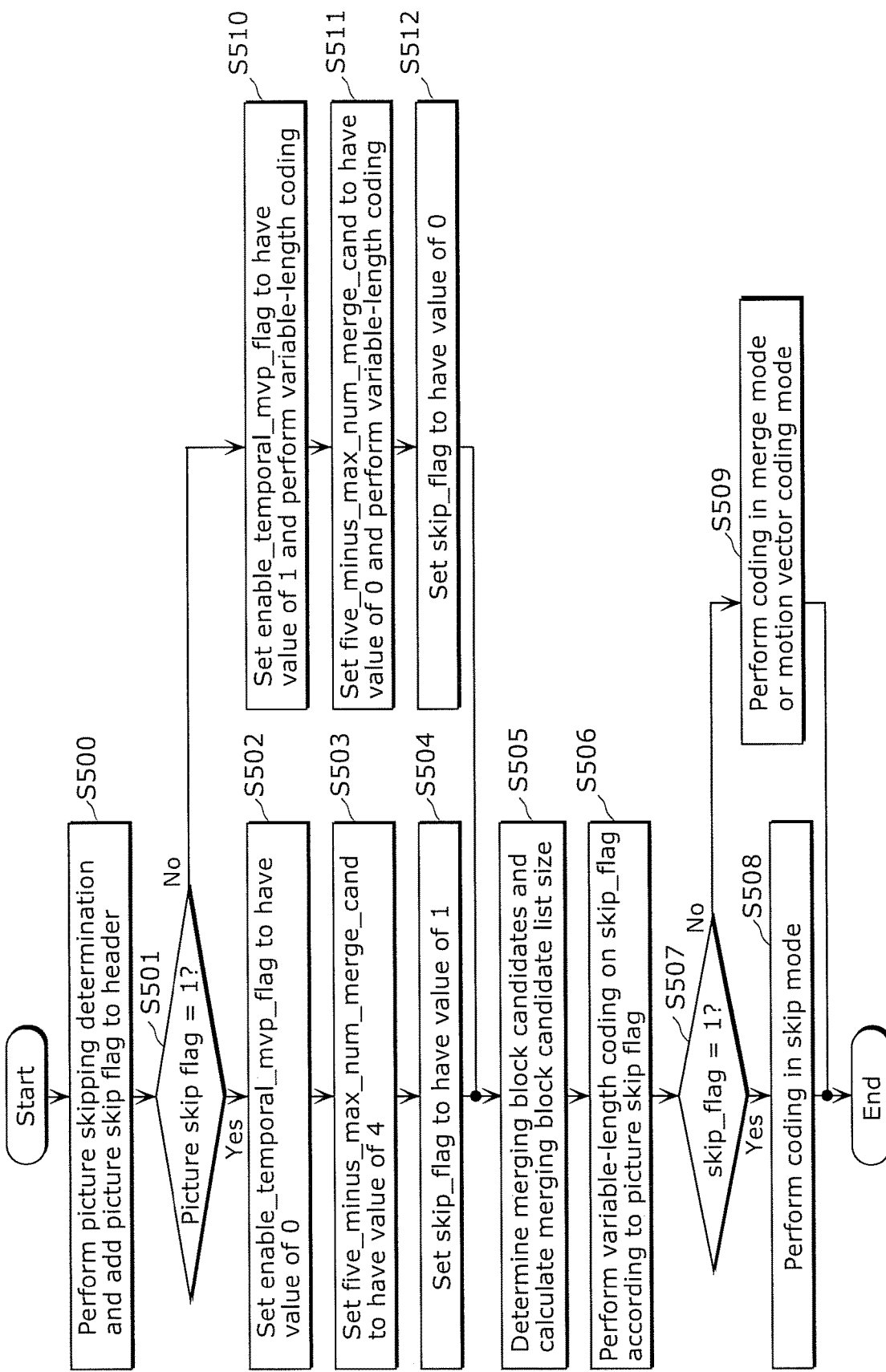
FIG. 16 is a flowchart showing a moving picture coding method performed by the moving picture coding apparatus according to Embodiment 3.

FIG. 16 is a flowchart showing the moving picture coding method performed by the moving picture coding apparatus 100a according to Embodiment 3. First, in S500, a picture skipping determination is performed using the method as shown in FIG. 8 to determine a value of a picture skip flag. Then, the picture skip flag is attached to a header. In S501, whether or not the picture skip flag has a value of 1 is determined. When the result of the determination is true (S501, Yes), enable_temporal_mvp_flag is set to have a value of 0 in S502. In S503, five_minus_max_num_merge_cand is set to have a value of 4, and in S504, skip_flag is set to have a value of 1.

In this manner, when it is determined in S501 that a picture skip flag has a value of 1, enable_temporal_mvp_flag is set to have a value of 0, and five_minus_max_num_merge_cand is set to have a value of 4, and skip_flag is set to have a value of 1.

When the result of the determination in S501 is false (S501, No), enable_temporal_mvp_flag is set to have a value of 1 and attached to a header in S510, and five_minus_max_num_merge_cand is set to have a value of 0 and attached to a header in S511. Next, in S512, skip_flag is set to have a value of 0.

In this manner, coding efficiency can be increased by omitting attaching enable_temporal_mvp_flag and five_minus_max_num_merge_cand to a bitstream when picture skipping is performed (S501, Yes). In Embodiment 3, the value which five_minus_max_num_merge_cand is set to have in S511 is not limited to 0 and may be set to have a value other than 0.

In S505, the method shown in FIG. 10 is performed to generate merging block candidates from neighboring blocks and calculated a co-located block of a current block, and a merging block candidate list size. In S506, skip_flag is coded by variable-length coding according to the value of the picture skip flag. More specifically, when picture skip flag has a value of 1, skip_flag can be estimated to have a value of 1, and thus skip_flag is not attached to a bitstream. When a picture skip flag has a value of 0, skip_flag is coded by variable-length coding and attached to a bitstream. In this manner, attaching skip_flag to a bitstream can be omitted when picture skipping is performed, so that coding efficiency can be increased.

In S507, whether or not skip_flag has a value of 1 is determined. When the result of the determination in S507 is true (S507, Yes), the current block is coded in the skip mode in S508. More specifically, a merging block candidate index of a merging block candidate to be used for generation of a prediction picture in the skip mode is coded by variable-length coding according to a merging block candidate list size. When a merging block candidate list size is 1, the merging block candidate index can be estimated to have a value of 0. In this case, it is possible to attach no merging block candidate index to a bitstream. This will further increase coding efficiency. When the result of the determination in S507 is false (S507, No), in S509, the current block is coded in the prediction coding mode determined based on a result of processing such as comparison between prediction error of an inter prediction image generated using a motion vector derived by motion estimation and prediction error of a prediction picture generated using a merging block candidate. In other words, the current block is coded in the merge mode or the motion vector coding mode.

The processing step of S500 is performed by the picture-skipping determination unit 117 and the variable-length-coding unit 116a, and the processing steps of S501 to S505 and S510 to S512 by the merging block candidate calculation unit 114 and the variable-length-coding unit 116a, for an example. The processing step of S506 is performed by the variable-length-coding unit 116a and the processing steps of S507 to S509 by a group of constituent elements including the inter prediction unit 110 and the inter prediction control unit 111, for an example.

In Embodiment 3, as exemplified in FIG. 4, the merging block candidate index corresponding to the neighboring block A has a value of 0, the merging block candidate index corresponding to the neighboring block B has a value of 1, the merging block candidate index corresponding to the co-located merging block has a value of 2, and the merging block candidate index corresponding to the neighboring block D has a value of 3. However, assignment of merging block candidate indices is not limited to the example. For example, when a new candidate such as a zero vector candidate is added using a method described later, smaller values may be assigned to preexistent merging block candidates and a larger value to the new candidate so that the preexistent merging block candidates are prioritized. Moreover, the merging block candidates are not limited to the neighboring blocks A, B, C, or D. For example, a neighboring block located above the lower left neighboring block D may be also used as a merging block candidate. Optionally, it is not necessary to use all the neighboring blocks. For example, only the neighboring blocks A and B may be used as merging block candidates.

Moreover, attaching a merging block candidate index to a bitstream in S508 in FIG. 16 is not necessary in Embodiment 3. Optionally, attaching a merging block candidate index may be omitted when a merging block candidate list size is 1. The amount of information on the merging block candidate index is thereby reduced.

In this manner, according to Embodiment 3, a picture skip flag is set to have a value of 1 so that all blocks in a picture can be coded in the skip mode using a zero vector. This will increase coding efficiency especially for consecutive still pictures. More specifically, when a picture skip flag has a value of 1, setting enable_temporal_mvp_flag to have a value of 0 and skip_flag to have a value of 1 enables coding all blocks in a picture in the skip mode using a zero vector. Furthermore, setting five_minus_max_num_merge_cand to have a value of 4 (the merging block candidate list size to have a value of 1) makes sending of a merging block candidate index unnecessary, so that coding efficiency in picture skipping can be increased. Furthermore, coding efficiency can be increased by omitting attaching skip_flag, enable_temporal_mvp_flag, and five_minus_max_ num_merge_cand to a bitstream when a picture skip flag has a value of 1.

In Embodiment 3, five_minus_max_num_merge_cand is set to have a value of 4 (a merging block candidate list size is set to have a value of 1) and a zero vector candidate among merging block candidates is used so that all blocks in a picture are coded using the zero vector candidate in the skip mode, which is not limiting the present invention. For example, five_minus_max_num_merge_cand is set to have a value of 5 (a merging block candidate list size is set to have a value of 0). In this case where a merging block candidate list size is 0, coding is performed in the skip mode using a zero vector so that no merging block candidate is calculated. Coding may be thus performed on all blocks in a picture in the skip mode using a zero vector while computational complexity is reduced.

Embodiment 4

Figure 17:
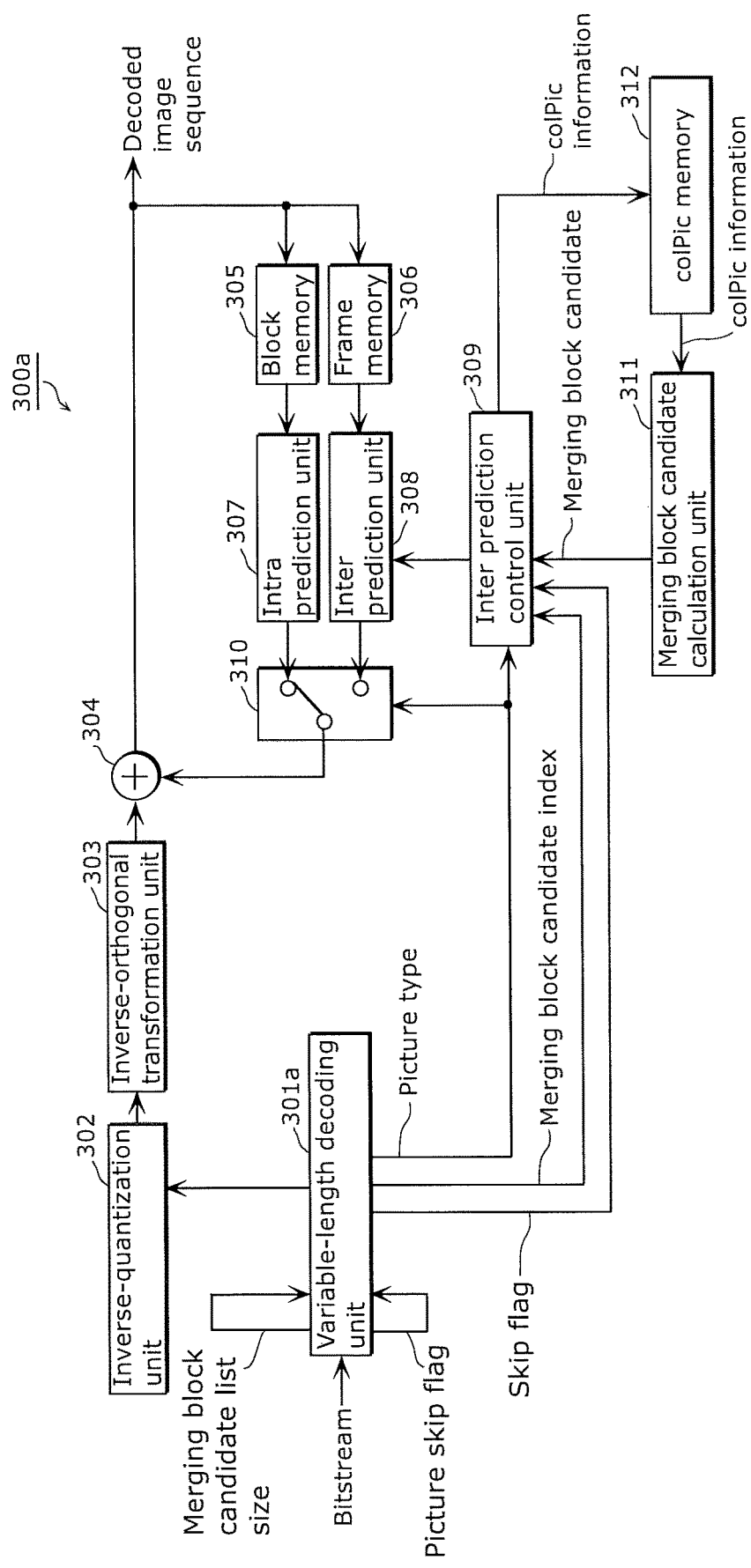
FIG. 17 is a block diagram showing an exemplary configuration of a moving picture decoding apparatus in which a moving picture decoding method according to Embodiment 4 is used.

FIG. 17 is a block diagram showing an exemplary configuration of a moving picture decoding apparatus in which a moving picture decoding method according to Embodiment 4 is used. Embodiment 4 is different from Embodiment 2 only in that a picture skip flag a is decoded from a bitstream, and therefore description of the other points is omitted.

Specifically, for example, the moving picture decoding apparatus 300a decodes, on a block-by-block basis, coded images included in a bitstream generated by the moving picture coding apparatus 100a according to Embodiment 3. As shown in FIG. 17, the moving picture decoding apparatus 300a 400 includes a variable-length decoding unit 301a, an inverse-quantization unit 302, an inverse-orthogonal transformation unit 303, an adder 304, block memory 305, frame memory 306, an intra prediction unit 307, an inter prediction unit 308, an inter prediction control unit 309, a switch 310, a merging block candidate calculation unit 311, and colPic memory 312.

The variable-length decoding unit 301a obtains picture-type information (picture type), a picture skip flag, a skip flag, a merging block candidate list size (specifically, five_minus_max_num_merge_cand), and a quantized coefficient by performing variable-length decoding on an input bitstream. Furthermore, the variable-length decoding unit 301a obtains a merging block candidate index by performing variable-length decoding using a merging block candidate list size.

The merging block candidate calculation unit 311 calculates a merging block candidate list size using a method described later and derives merging block candidates for merge mode and skip mode using motion vectors and others of neighboring blocks of a current block and a motion vector and others of a co-located block (colPic information) of the current block stored in the colPic memory. Furthermore, the merging block candidate calculation unit 311 assigns merging block candidate indices to the derived merging block candidates, and transmits the merging block candidates and merging block candidate indices to the inter prediction control unit 309.

When the skip flag decoded has a value of "0", the inter prediction control unit 309 causes the inter prediction unit 308 to generate an inter prediction image using information for motion vector estimation mode or merge mode. When the skip flag has a value of "1", the inter prediction control unit 309 determines, based on a decoded merging block candidate index, a motion vector, a reference picture index, and a prediction direction for use in inter prediction from a plurality of merging block candidates. Then, the inter prediction control unit 309 causes the inter prediction unit 308 to generate an inter prediction image using the determined motion vector, reference picture index, and prediction direction. Furthermore, the inter prediction control unit 309 transfers colPic information including the motion vector of the current block to the colPic memory 312.

Finally, the adder 304 generates decoded image sequence by adding prediction image data and prediction error image data.

Figure 18:
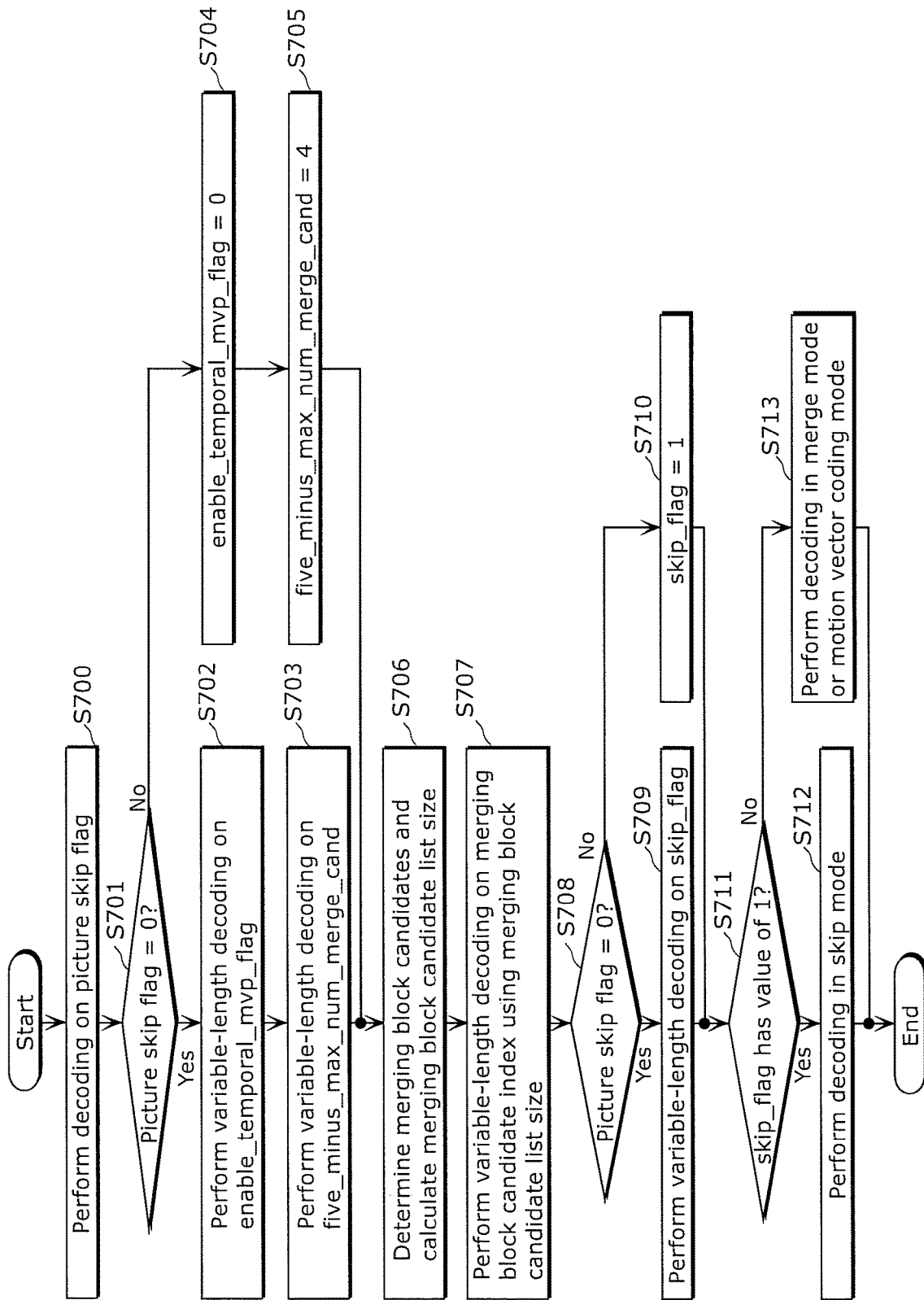
FIG. 18 is a flowchart showing a moving picture decoding method performed by the moving picture decoding apparatus according to Embodiment 4.

FIG. 18 is a flowchart showing a moving picture decoding method performed by the moving picture decoding apparatus 300a according to Embodiment 4. First, in S700, a picture skip flag is decoded from a bitstream. In S701, whether or not the picture skip flag has a value of 0 is determined. When the result of the determination is true (S701, Yes), enable_temporal_mvp_flag is decoded in S702, and five_minus_max_num_merge_cand is decoded in S703.

When the result of the determination in S701 is false (S701, No), enable_temporal_mvp_flag is set to have a value of 0 in S704, and five_minus_max_num_merge_cand is set to have a value of 4 in S705. In S706, a method as shown in FIG. 10 is performed to calculate a merging block candidate list size and generate merging block candidates from neighboring blocks and a co-located block of a current block to be decoded. In S707, variable-length decoding is performed on a merging block candidate index included in a bitstream using the merging block candidate list size. When the merging block candidate list size is 1, the merging block candidate index may be estimated to have a value of 0 without decoding a merging block candidate index. In S708, whether or not the picture skip flag has a value of 0 is determined. When the result of the determination is true (S708, Yes), skip_flag is decoded in S709. When the result of the determination in S708 is false (S708, No), skip_flag is set to have a value of 1 in S710. In S711, whether or not skip_flag has a value of 1 is determined. When the result of the determination in S711 is true (S711, Yes), in S712, an inter prediction picture is generated in the skip mode using a motion vector, a reference picture index, and a prediction direction of a merging block candidate indicated by a merging block candidate index. In other words, a current block is decoded in the skip mode. When the result of the determination in S711 is false (S711, No), in S713, an inter prediction picture is generated using information for merge mode or motion vector coding mode. In other words, the current block is decoded in the merge mode or the motion vector coding mode.

The processing steps of S700 to S705 and S707 to S710 are performed by the variable-length decoding unit 301a, and the processing step of S706 by the merging block candidate calculation unit 311, for an example. The processing steps of S711 to S713 are performed by a group of constituent elements including the inter picture prediction control unit 309 and the inter prediction unit 308, for an example.

Figure 19:
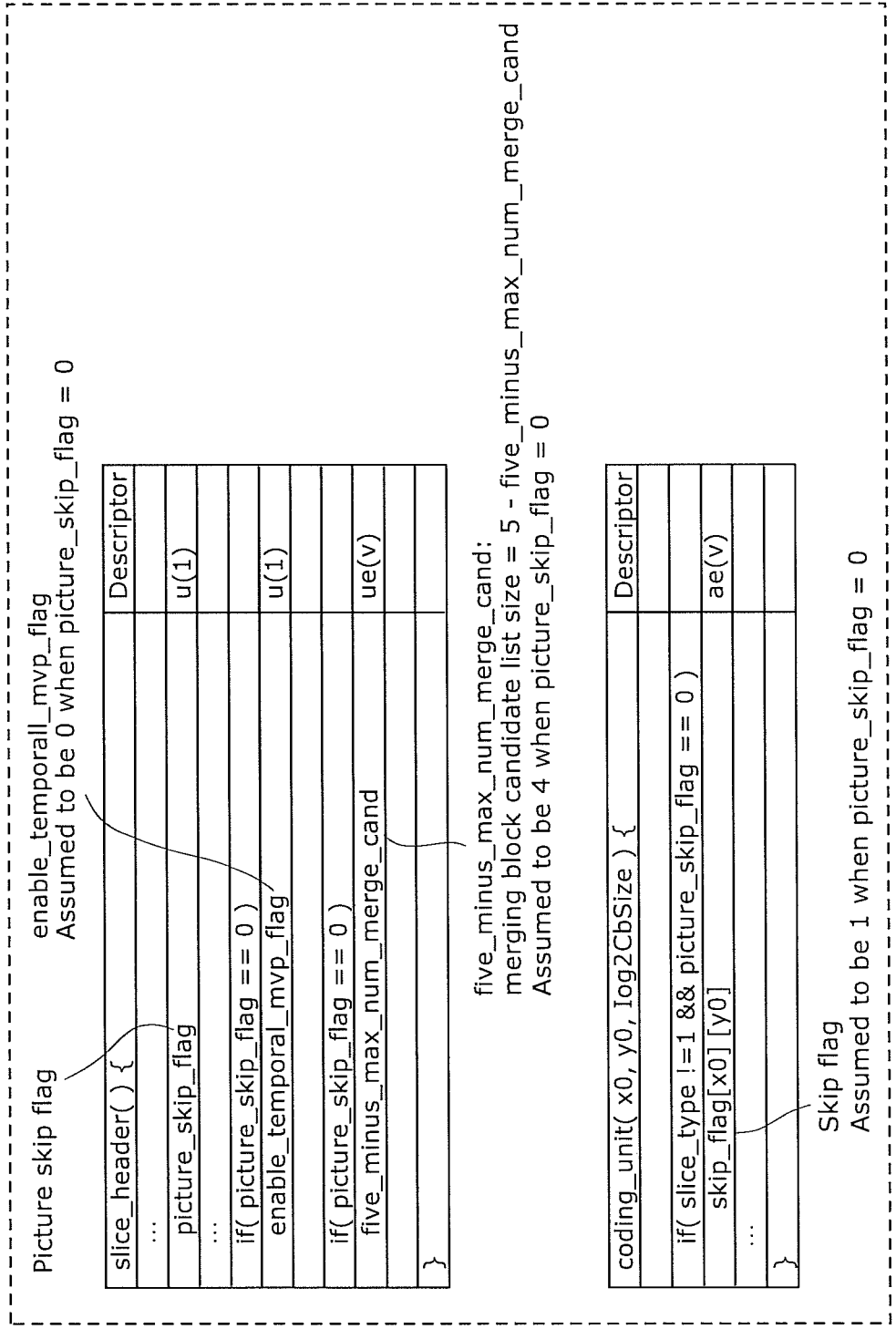
FIG. 19 shows exemplary syntax according to Embodiment 4.

FIG. 19 shows exemplary syntax according to Embodiment 4. Specifically, the syntax is used for attaching a picture skip flag (picture_skip_flag), enable_temporal_mvp_flag, five_minus_max_num_merge_cand, and skip_flag to a bitstream. The picture skip flag may be attached to a header of another type such as an SPS, a PPS or the like.

In this manner, according to Embodiment 4, a picture skip flag is set to have a value of 1 so that a bitstream generated by coding all blocks in a picture in the skip mode using a zero vector, especially a bitstream of consecutive still pictures coded with increased coding efficiency, can be appropriately decoded. More specifically, when a picture skip flag has a value of 1, enable_temporal_mvp_flag is set to have a value of 0 and skip_flag is set to have a value of 1. By using this setting, it is possible to appropriately decode a bitstream generated by coding all blocks in a picture in the skip mode using a zero vector. Furthermore, when five_minus_max_num_merge_cand is set to have a value of 4 (the merging block candidate list size is set to have a value of 1), a merging block candidate index need not be transmitted by the moving picture coding apparatus 100a. Thus, the moving picture decoding apparatus 300a in Embodiment 4 can appropriately decode a bitstream coded with increased coding efficiency for picture skipping. Furthermore, when a picture skip flag has a value of 1, attaching skip_flag, enable_temporal_mvp_flag, and five_minus_max_num_merge_cand to a bitstream is omitted. Thus, the moving picture decoding apparatus 300a in Embodiment 4 can appropriately decode a bitstream coded with coding efficiency increased by omitting attaching the information.

Each of the constituent elements in each of the above-described embodiments may be configured in the form of an exclusive hardware product, or may be implemented by executing a software program suitable for the structural element. The constituent elements may be implemented by a program execution unit such as a CPU or a processor which reads and executes a software program recorded on a recording medium such as a hard disk or a semiconductor memory. Here, examples of the software program which implements the moving picture coding apparatus and others in the above-described embodiments include a program as follows.

The program causes a computer to execute the following moving picture coding method. The moving picture coding method is a method of merging a prediction direction, a motion vector, and a reference picture index of at least one merging candidate to code a current block, and the method includes: making a determination as to whether or not to code all blocks in a current picture in the skip mode; setting, based on a result of the determination, a first flag indicating whether or not a temporally neighboring block which is included in a picture different from the current picture and temporally neighbors the current block is to be referenced; setting, based on the result of the determination, a value of a parameter for determining a total number of merging candidates; setting, based on the result of the determination, a second flag for each block included in the current picture, the second flag indicating whether or not the block is to be coded in the skip mode; determining, based on the first flag and the total number of the merging candidates, the at least one merging candidate from among one or more candidates including a neighboring block which is either a block spatially neighboring the current block in a picture including the current block or a temporally neighboring block included in the picture different from the current picture, the determined at least one merging candidate being at least one candidate usable for the merging; selecting a merging candidate to be used for coding of the current block from among the determined at least one merging candidate; and coding an index which indicates the selected merging candidate and attaching the coded index to a bitstream, according to the total number of the merging candidates.

Here, examples of the software program which implements the moving picture decoding apparatus and others in the above-described embodiments include a program as follows. The program causes a computer to execute the following moving picture decoding method. The moving picture decoding method is a method of merging a prediction direction, a motion vector, and a reference picture index of at least one merging candidate to decode a current block, and the method includes: decoding a first flag indicating whether or not a temporally neighboring block which is included in a picture different from the current picture and temporally neighbors the current block is to be referenced; decoding a value of a parameter for determining a total number of merging candidates; decoding a second flag which is set for each block included in the current picture and indicates whether or not the block is to be decoded in the skip mode; determining, based on the first flag and the total number of the merging candidates, the at least one merging candidate from among one or more candidates including a neighboring block which is either a block spatially neighboring the current block in a picture including the current block and or a temporally neighboring block included in the picture different from the current picture, the determined at least one merging candidate being at least one candidate usable for the merging; and decoding, according to the total number of the merging candidates, an index which indicates a merging candidate to be used for decoding of the current block, the merging candidate to be used for decoding of the current block being among the at least one determined merging candidate.

Although the moving picture coding apparatus and moving picture decoding apparatus according to one or more aspects of the present disclosure have been described based on the embodiments, the present invention is not limited to these embodiments. Those skilled in the art will readily appreciate that many modifications of the exemplary embodiments or embodiments in which the constituent elements of the exemplary embodiments are combined are possible without materially departing from the novel teachings and advantages described in the present invention. All such modifications and embodiments are also within scopes of one or more aspects of the present invention.

Embodiment 5

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 20:
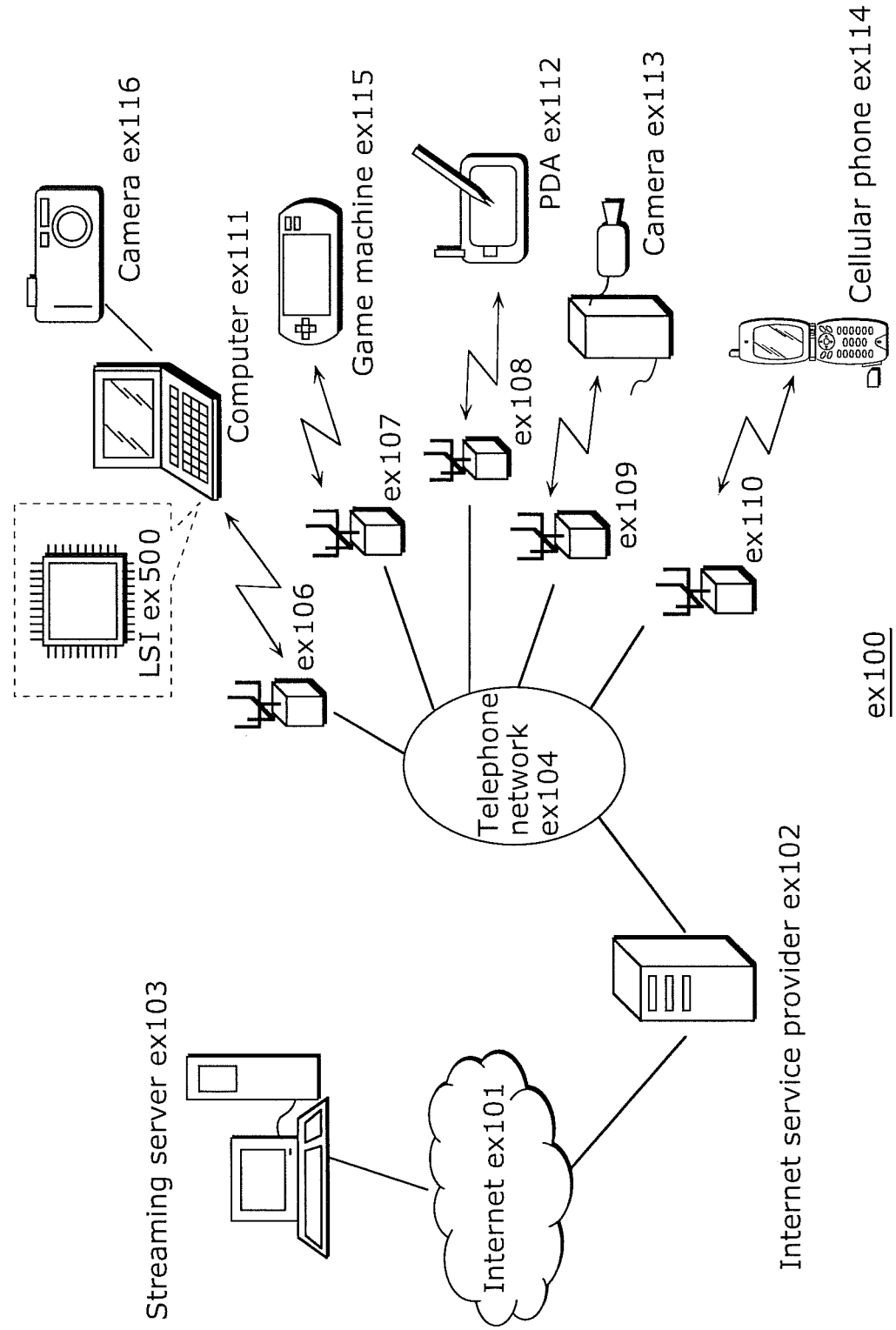
FIG. 20 shows an overall configuration of a content providing system for implementing content distribution services.

FIG. 20 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 20, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for encoding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 21:
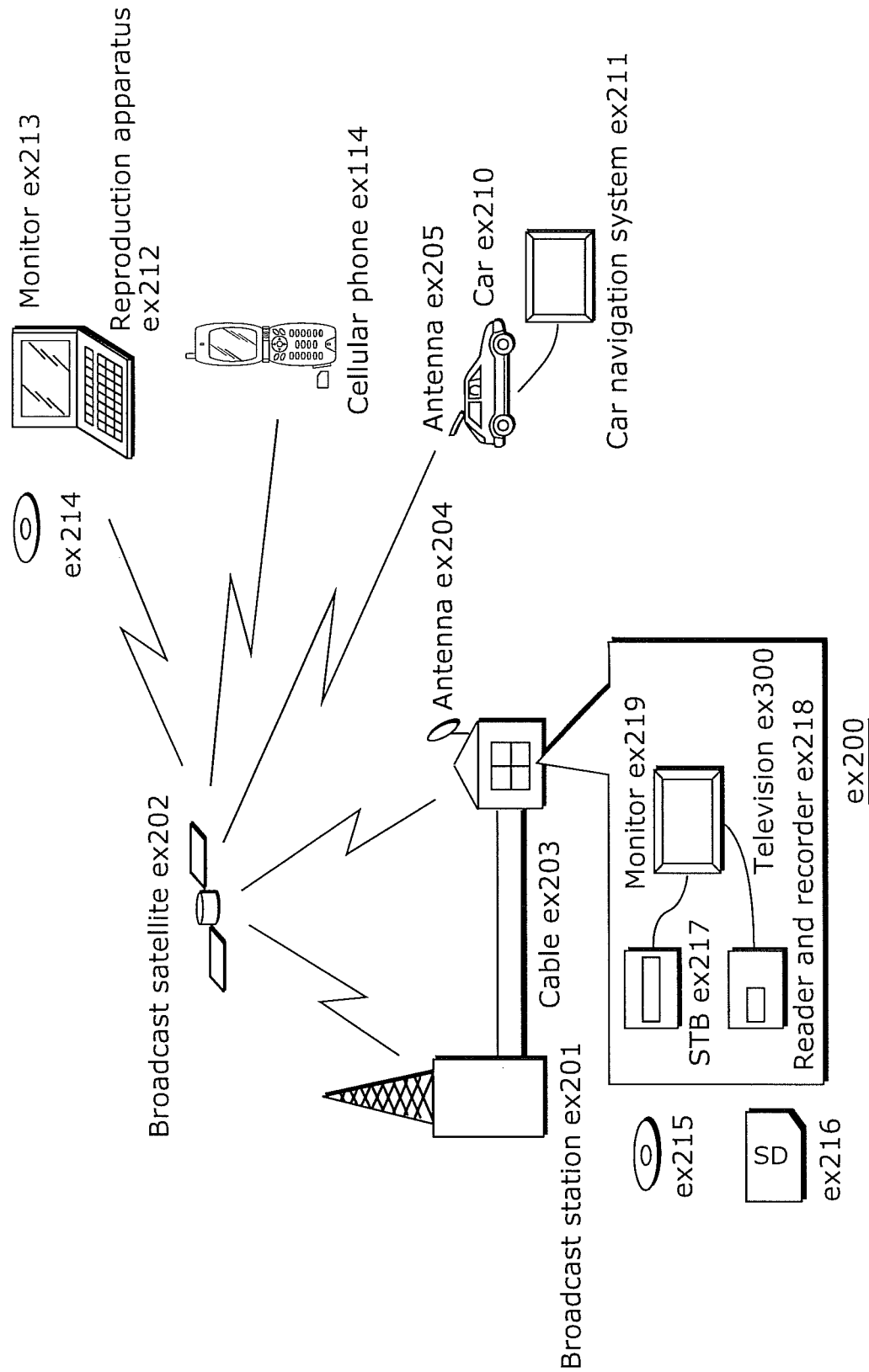
FIG. 21 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 21. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 22:
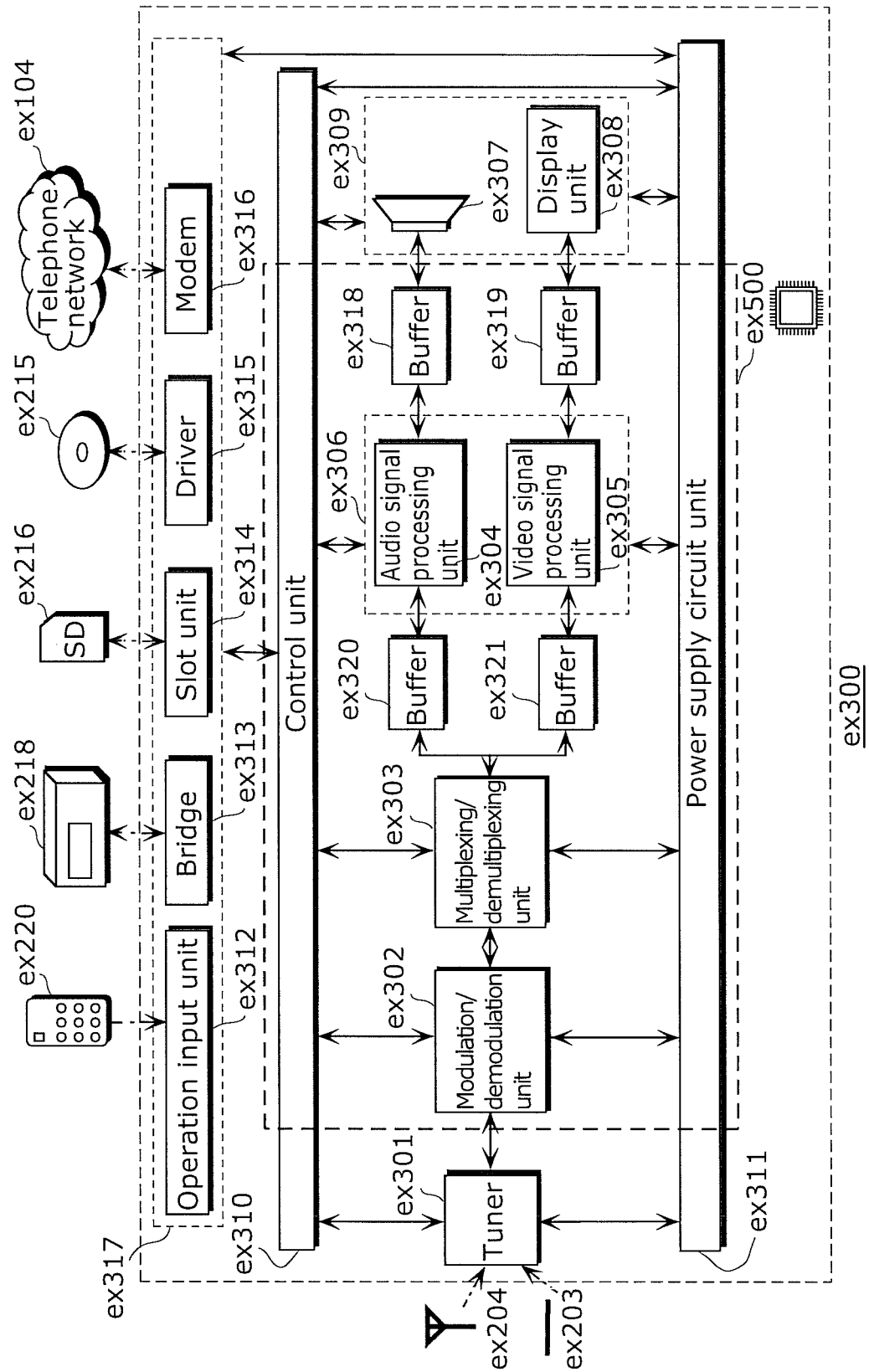
FIG. 22 shows a block diagram illustrating an example of a configuration of a television.

FIG. 22 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or encode the multiplexed data, and the television ex300 and the reader/recorder ex218 may share the decoding or encoding.

Figure 23:
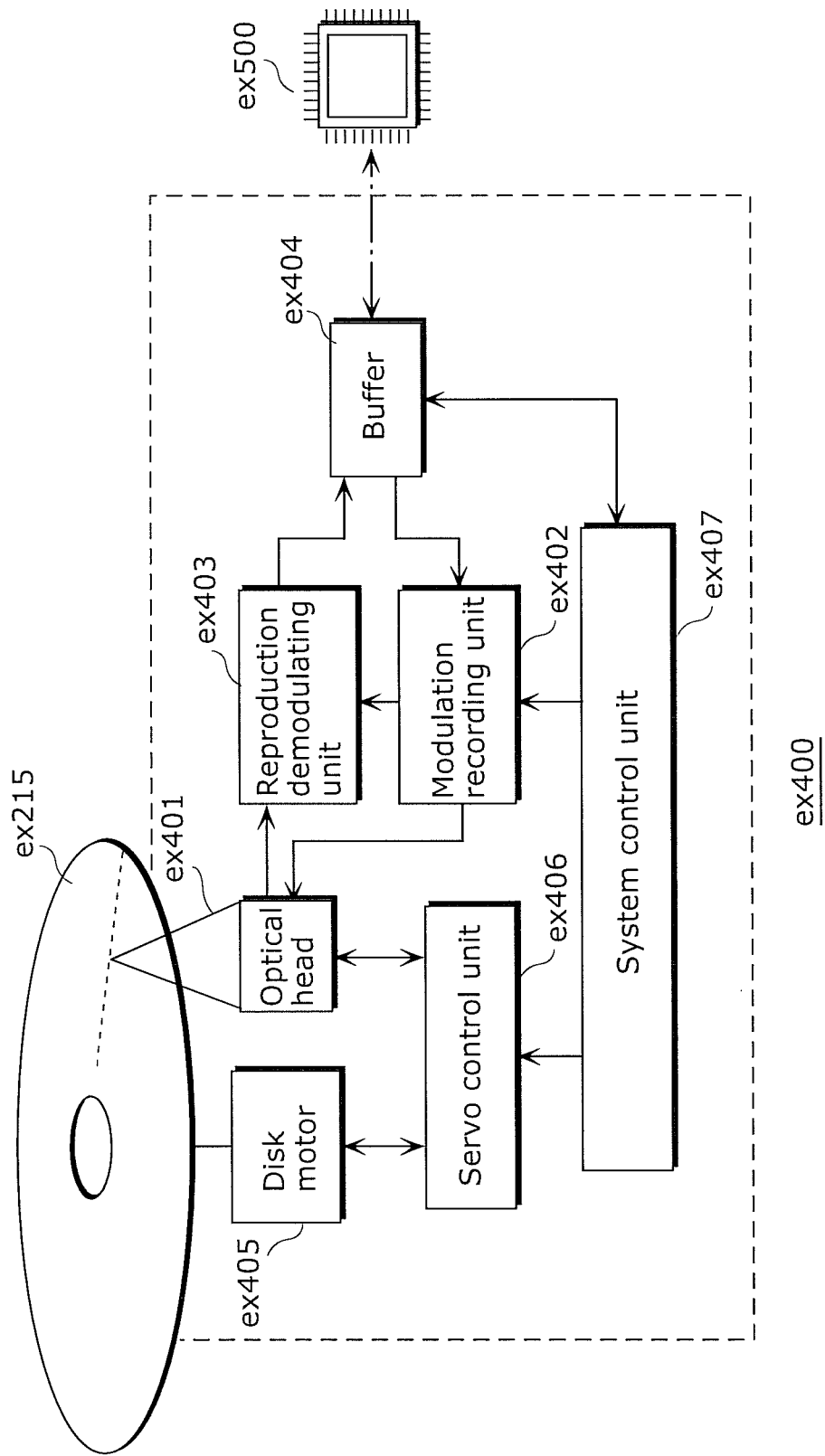
FIG. 23 shows a block diagram illustrating an example of a configuration of an information reproducing/recording unit that reads and writes information from and on a recording medium that is an optical disk.

As an example, FIG. 23 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 24:
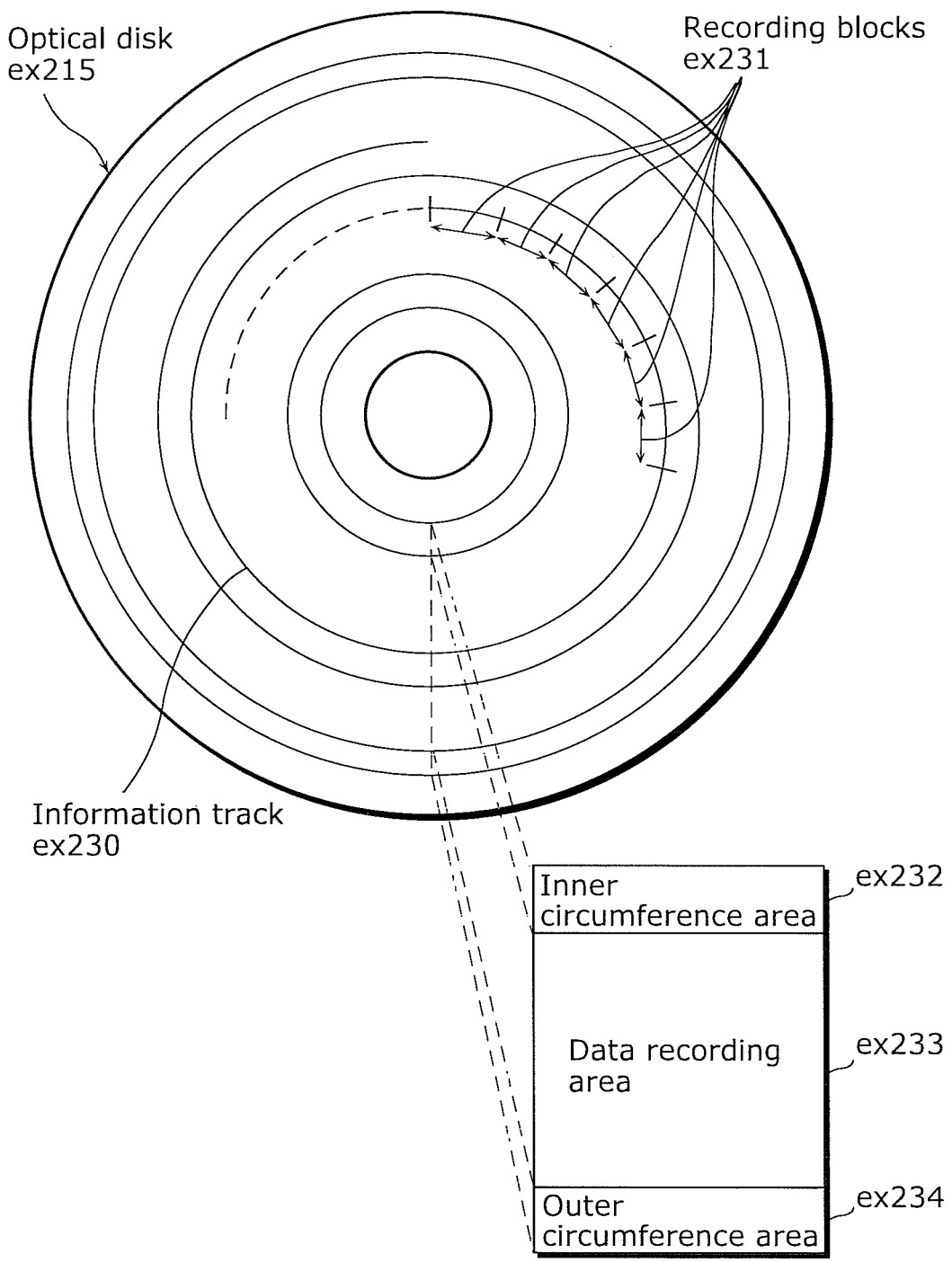
FIG. 24 shows an example of a configuration of a recording medium that is an optical disk.

FIG. 24 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 22. The same will be true for the configuration of the computer ex111, the cellular phone ex114, and others.

Figure 25A:
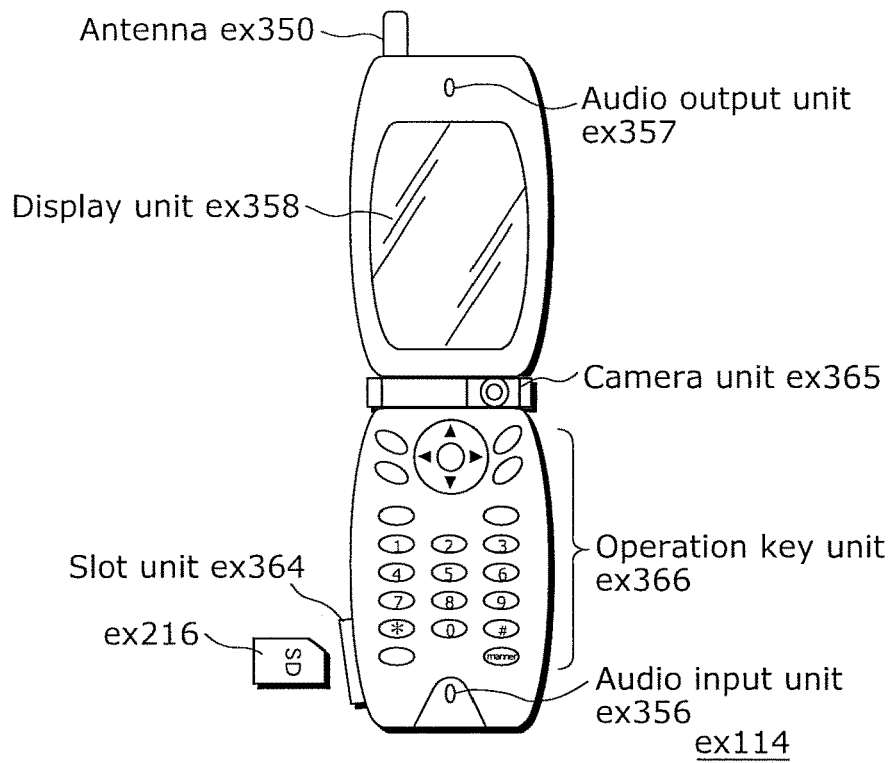
FIG. 25A shows an example of a cellular phone.

FIG. 25A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, encoded or decoded data of the received video, the still pictures, e-mails, or others; and a slot unit ex364 that is an interface unit for a recording medium that stores data in the same manner as the memory unit ex367.

Figure 25B:
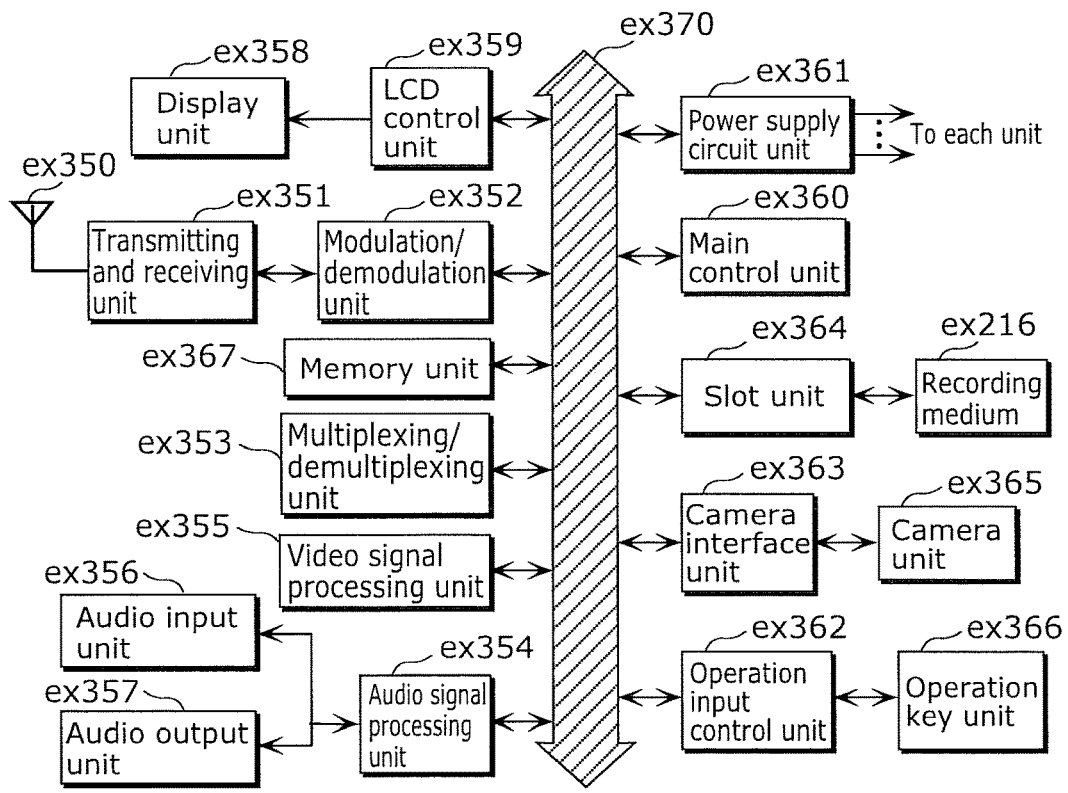
FIG. 25B is a block diagram showing an example of a configuration of a cellular phone.

Next, an example of a configuration of the cellular phone ex114 will be described with reference to FIG. 25B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, it is possible for a terminal such as the cellular phone ex114 to have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, various modifications and revisions can be made in any of the embodiments in the present disclosure.

Embodiment 6

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since the standard to which each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 26 illustrates a structure of the multiplexed data. As illustrated in FIG. 26, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 27:
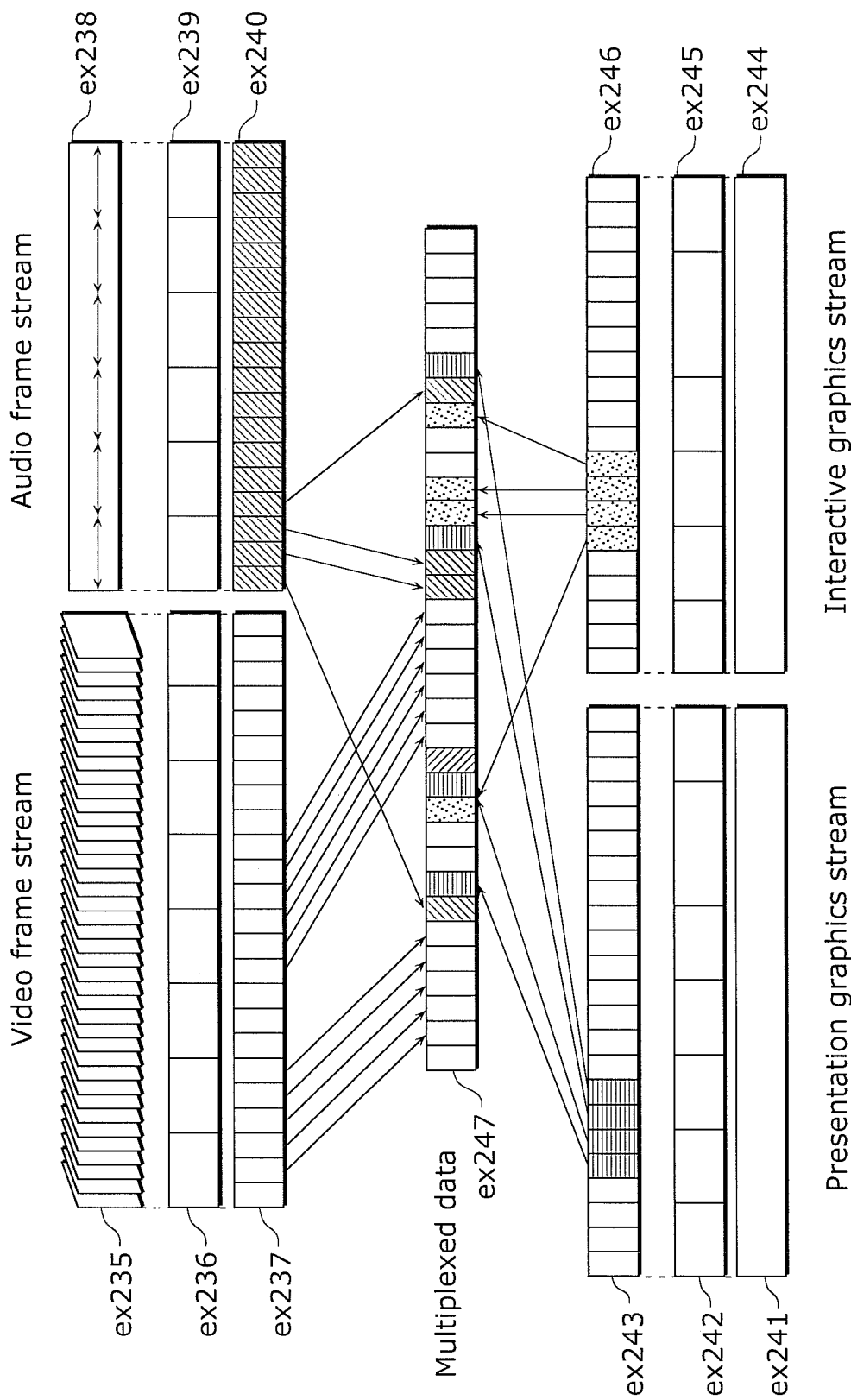
FIG. 27 schematically shows how each stream is multiplexed in multiplexed data.

FIG. 27 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 28:
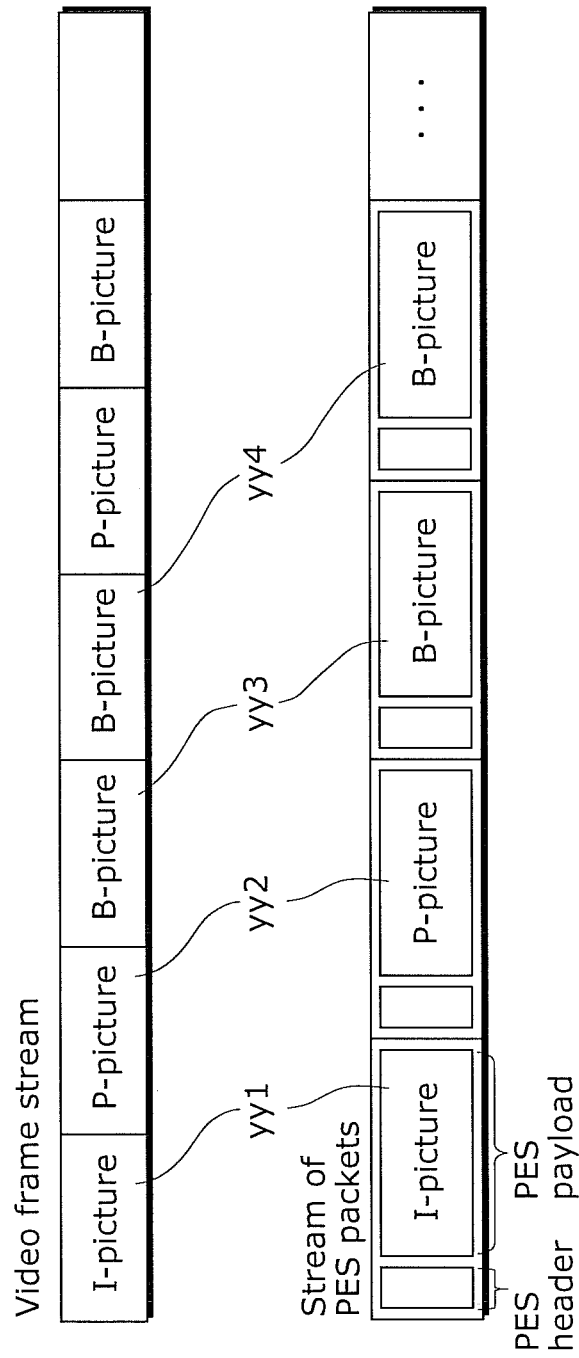
FIG. 28 shows how a video stream is stored in a stream of PES packets in more detail.

FIG. 28 illustrates how a video stream is stored in a stream of PES packets in more detail. The first bar in FIG. 28 shows a video frame stream in a video stream. The second bar shows the stream of PES packets. As indicated by arrows denoted as yy1, yy2, yy3, and yy4 in FIG. 28, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 29:
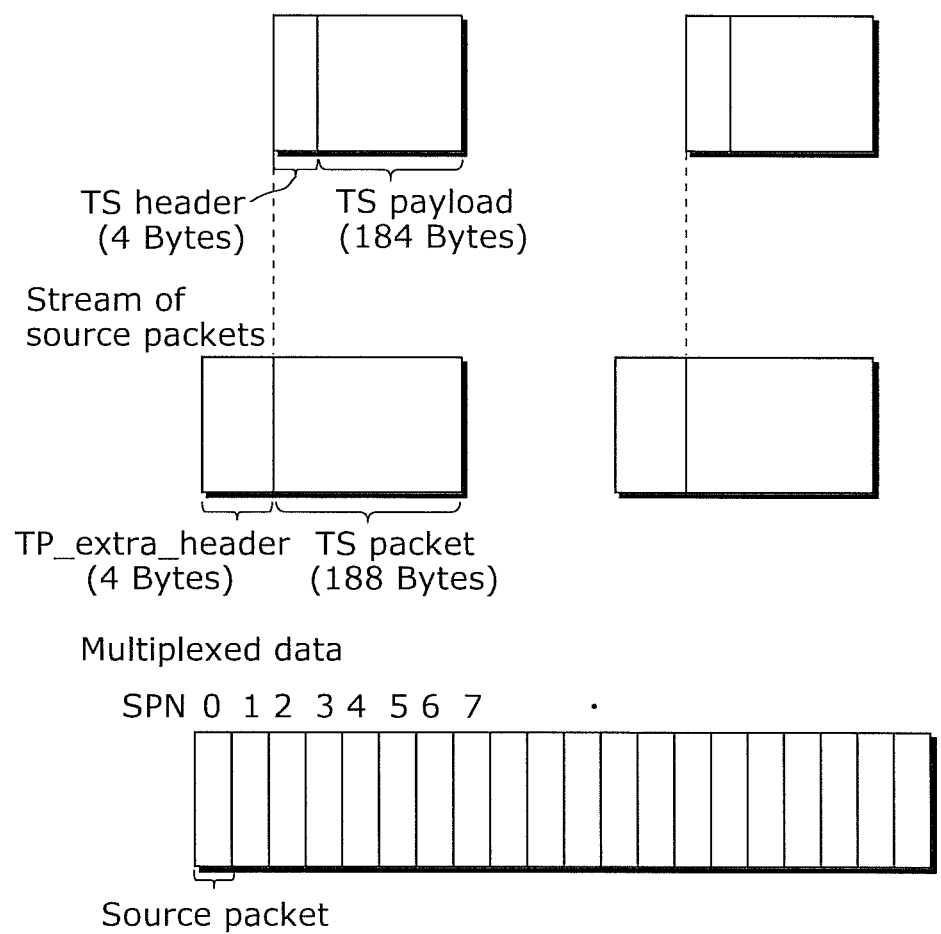
FIG. 29 shows a structure of TS packets and source packets in the multiplexed data.

FIG. 29 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 29. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 30:
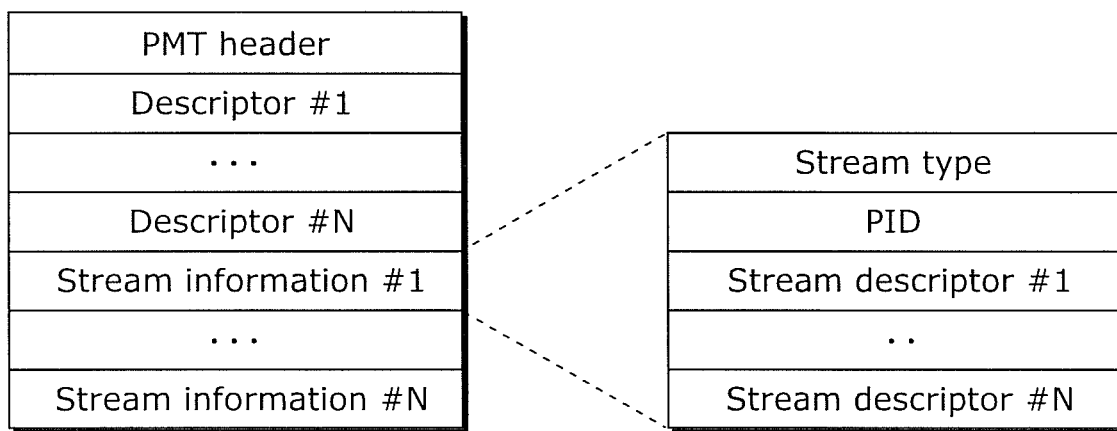
FIG. 30 shows a data structure of a PMT.

FIG. 30 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 31:
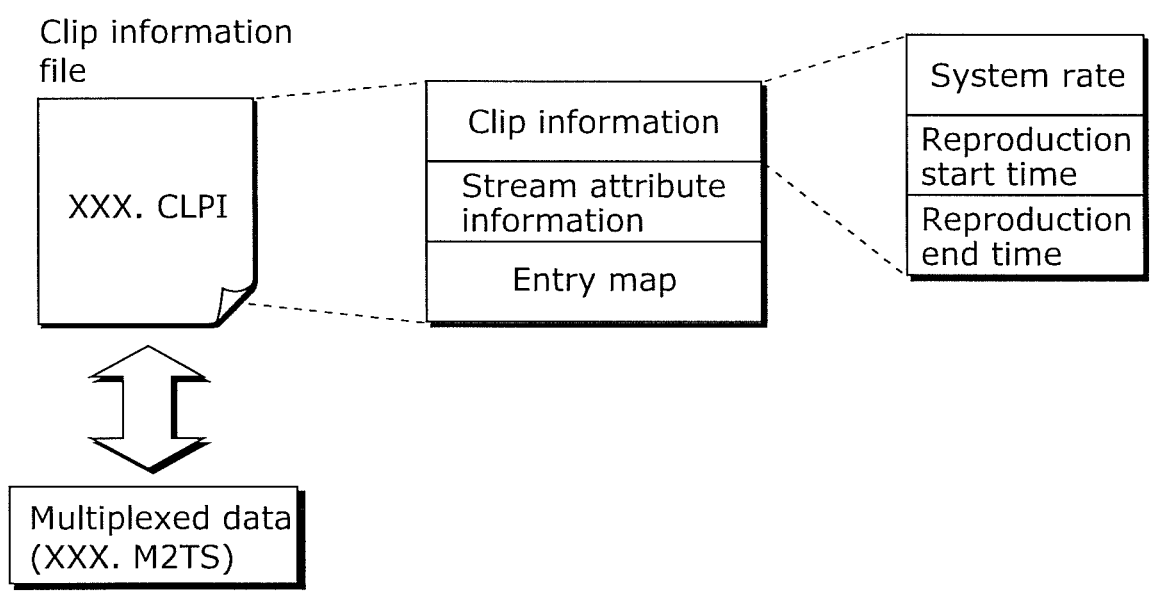
FIG. 31 shows an internal structure of multiplexed data information.

Each of the multiplexed data information files is management information of the multiplexed data as shown in FIG. 31. The multiplexed data information files are in one to one correspondence with the multiplexed data, and each of the files includes multiplexed data information, stream attribute information, and an entry map.

As illustrated in FIG. 31, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 32:
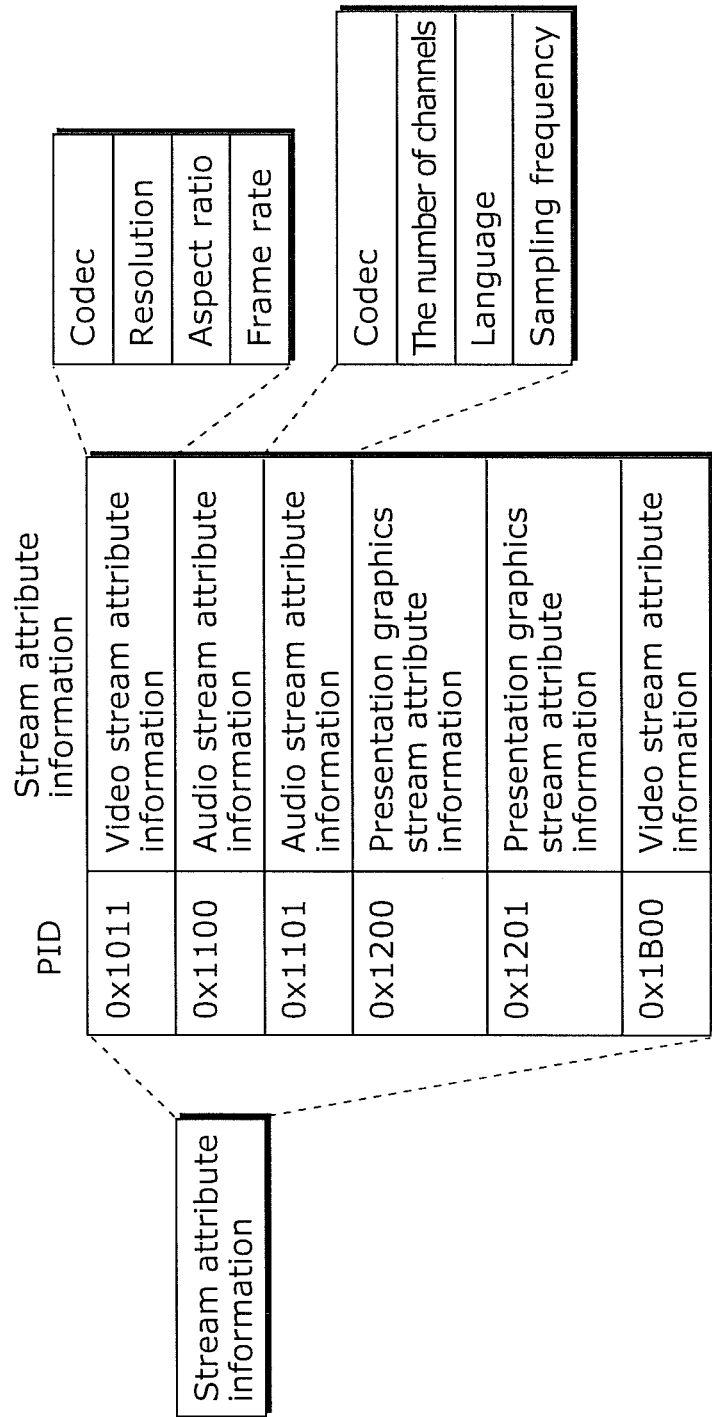
FIG. 32 shows an internal structure of stream attribute information.

As shown in FIG. 32, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 33:
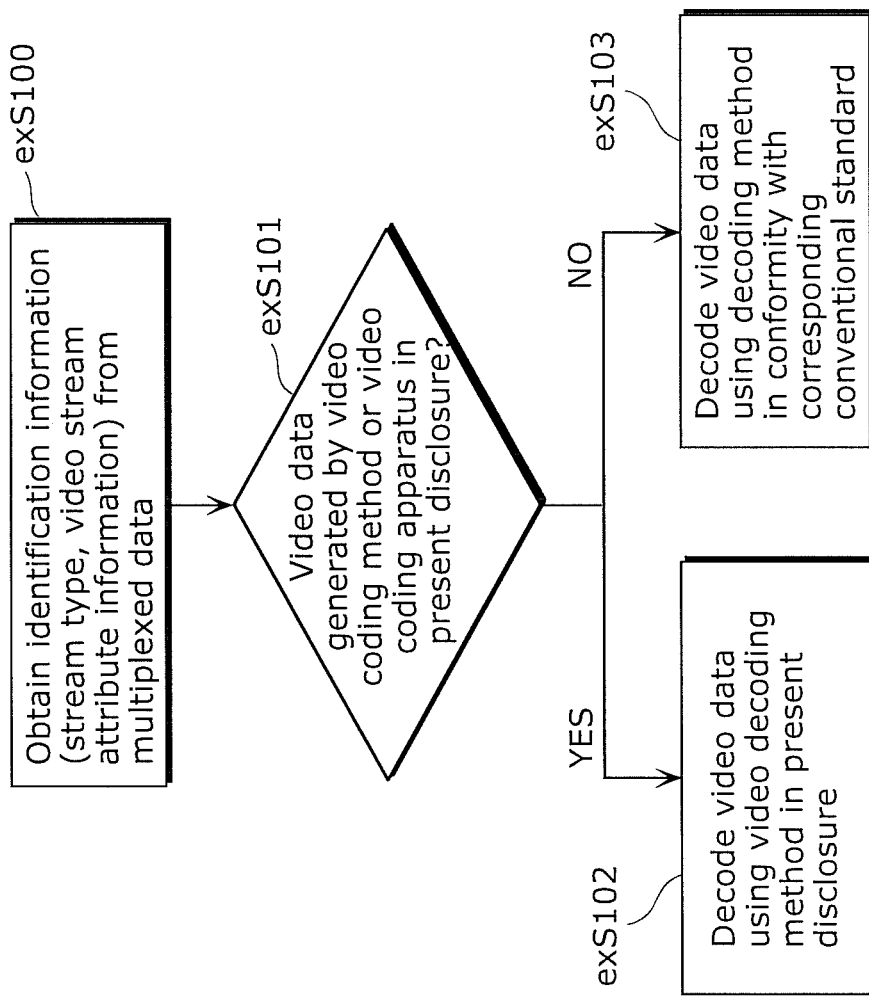
FIG. 33 shows steps for identifying video data.

Furthermore, FIG. 33 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 7

Figure 34:
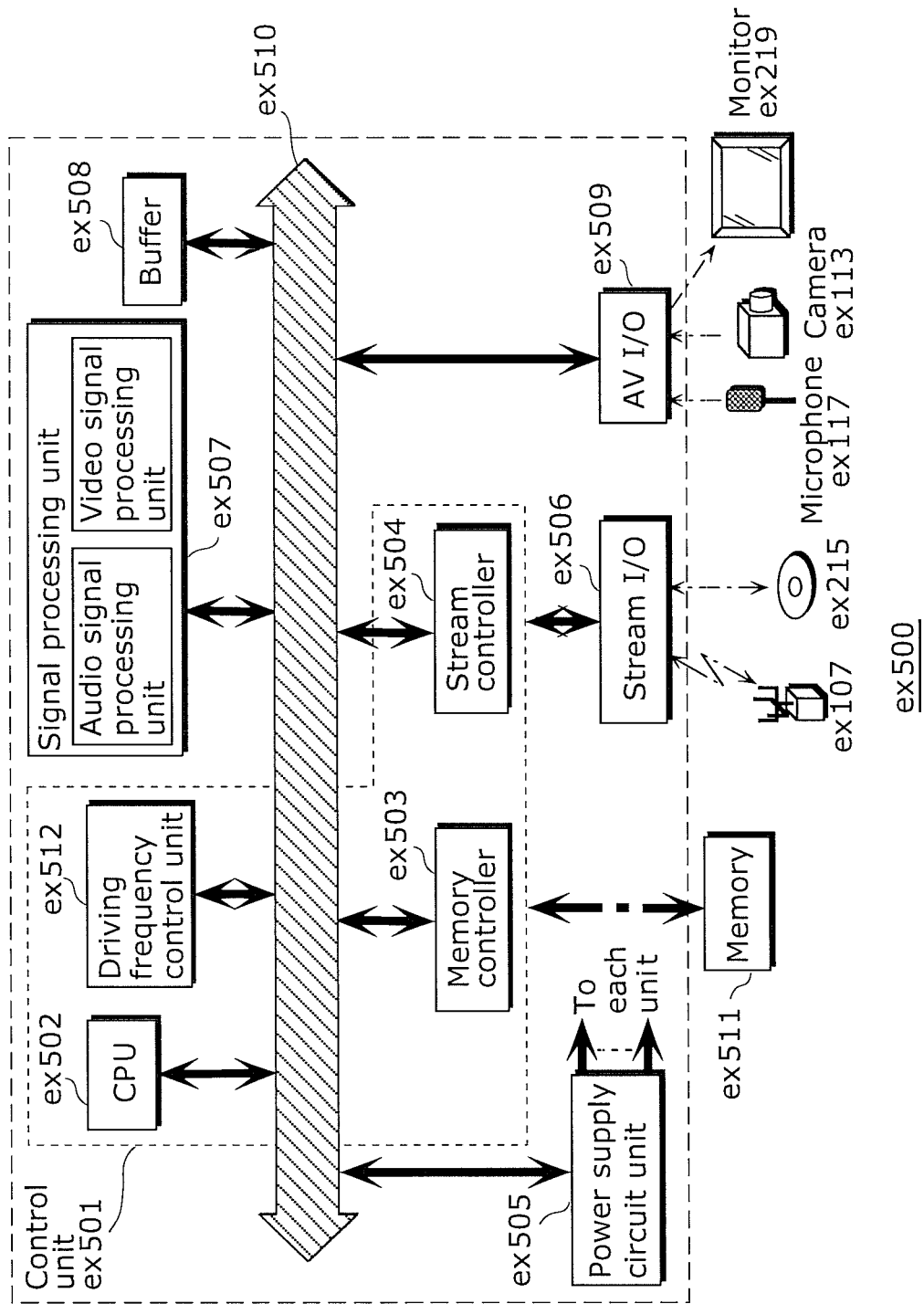
FIG. 34 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 34 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method and/or the moving picture decoding method according to any of the above embodiments, by loading or reading from a memory or the like one or more programs that are included in software or firmware.

In the future, with advancement in semiconductor technology, a brand-new technology may replace LSI. The functional blocks can be integrated using such a technology. The possibility is that the present disclosure is applied to biotechnology.

Embodiment 8

When video data generated in the moving picture coding method or by the moving picture coding apparatus described in each of embodiments is decoded, it is possible for the processing amount to increase compared to when video data that conforms to a conventional standard, such as MPEG-2, MPEG-4 AVC, and VC-1 is decoded. the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 35:
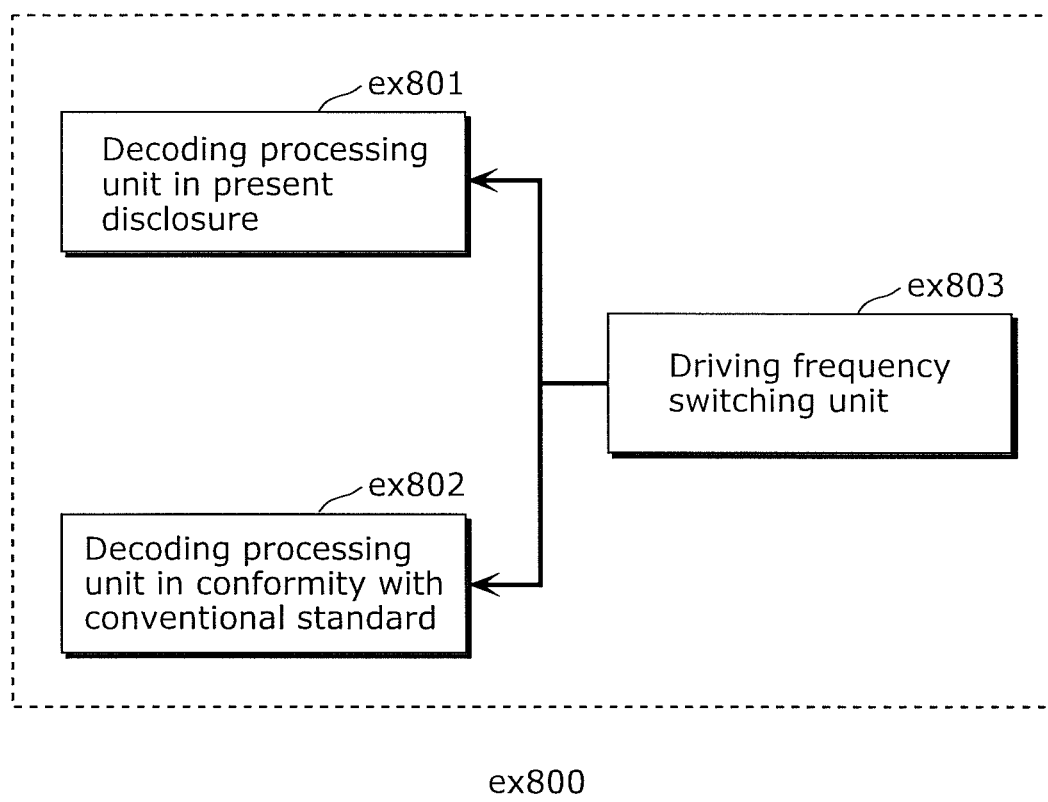
FIG. 35 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 35 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 34. Here, each of the decoding processing unit ex801 that executes the moving picture decoding method described in each of embodiments and the decoding processing unit ex802 that conforms to the conventional standard corresponds to the signal processing unit ex507 in FIG. 34. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, it is possible that the identification information described in Embodiment 6 is used for identifying the video data. The identification information is not limited to the one described in Embodiment 6 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 37. The driving frequency can be selected by storing the look-up table in the buffer ex508 and in an internal memory of an LSI, and with reference to the look-up table by the CPU ex502.

Figure 36:
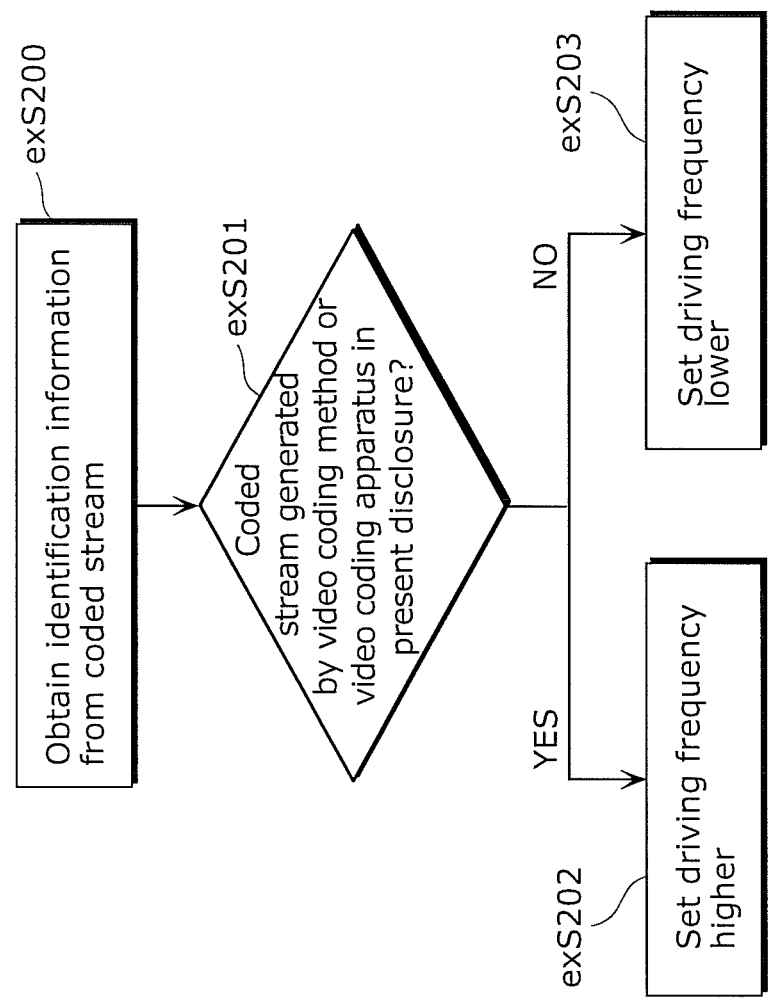
FIG. 36 shows steps for identifying video data and switching between driving frequencies.

FIG. 36 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, it is possible that the voltage to be applied to the LSI ex500 or the apparatus including the LSI ex500 is set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, it is possible that the driving frequency is set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, it is possible that the voltage to be applied to the LSI ex500 or the apparatus including the LSI ex500 is set higher. When the identification information indicates that the video data conforms to the conventional standard, such as MPEG-2, MPEG-4 AVC, and VC-1, it is possible that the voltage to be applied to the LSI ex500 or the apparatus including the LSI ex500 is set lower. As another example, it is possible that, when the identification information indicates that the video data is generated by the moving picture coding method and the moving picture coding apparatus described in each of embodiments, the driving of the CPU ex502 is not suspended, and when the identification information indicates that the video data conforms to the conventional standard, such as MPEG-2, MPEG-4 AVC, and VC-1, the driving of the CPU ex502 is suspended at a given time because the CPU ex502 has extra processing capacity. It is possible that, even when the identification information indicates that the video data is generated by the moving picture coding method and the moving picture coding apparatus described in each of embodiments, in the case where the CPU ex502 has extra processing capacity, the driving of the CPU ex502 is suspended at a given time. In such a case, it is possible that the suspending time is set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 9

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 38A:
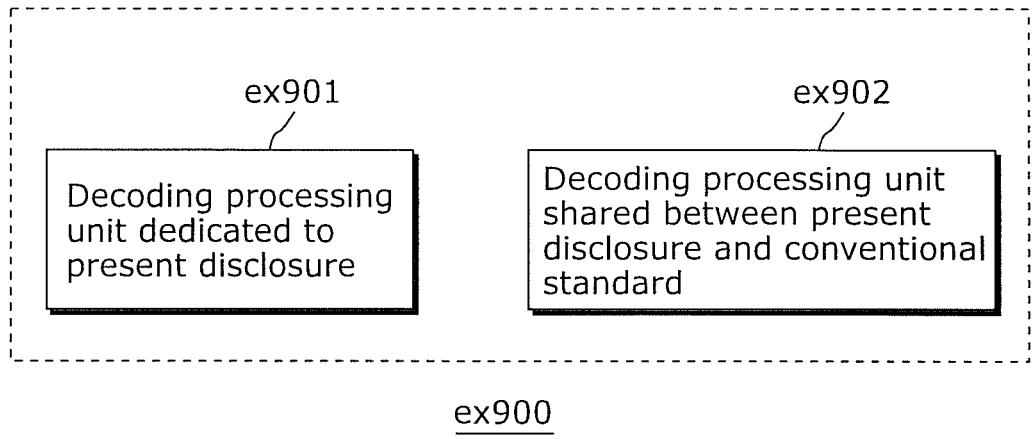
FIG. 38A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 38A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. It is possible for a decoding processing unit ex902 that conforms to MPEG-4 AVC to be shared by common processing operations, and for a dedicated decoding processing unit ex901 to be used for processing which is unique to an aspect of the present invention and does not conform to MPEG-4 AVC. In particular, since the aspect of the present invention is characterized by inverse quantization, it is possible, for example, for the dedicated decoding processing unit ex901 to be used for inverse quantization, and for the decoding processing unit to be shared by any or all of the other processing, such as entropy decoding, deblocking filtering, and motion compensation. The decoding processing unit for implementing the moving picture decoding method described in each of embodiments may be shared for the processing to be shared, and a dedicated decoding processing unit may be used for processing unique to that of MPEG-4 AVC.

Figure 38B:
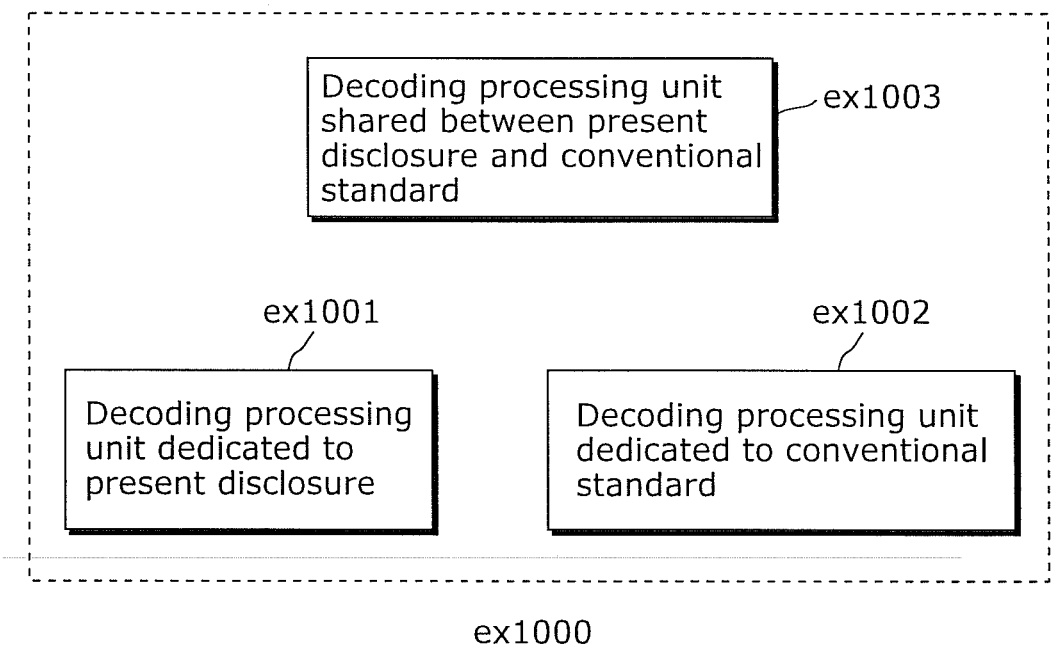
FIG. 38B is a diagram showing another example of a configuration for sharing a module of the signal processing unit.

Furthermore, ex1000 in FIG. 38B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

It should be noted that the above-described embodiments are provided for illustrative purposes and do not limit the scope of the claimed invention. Those skilled in the art will readily appreciate that many modifications of the exemplary embodiments or embodiments in which the constituent elements of the exemplary embodiments are combined are possible without materially departing from the novel teachings and advantages of the subjects recited in the claims attached hereto. All such modifications and embodiments are within the scope of the present disclosure.

INDUSTRIAL APPLICABILITY

The moving picture coding methods and moving picture decoding methods according to the present disclosure is applicable to multimedia data of any type, increasing error resistance in coding and decoding of moving pictures. For example, these methods are useful as moving picture coding methods and moving picture decoding methods for storage, transmission, and communication of data using mobile phones, DVD systems, personal computers, or the like.

The invention claimed is:

1. A moving picture decoding apparatus using a candidate to decode a current block, the moving picture decoding apparatus comprising:
a processor; and
a non-transitory computer-readable recording medium having stored thereon executable instructions, which when executed by the processor, cause the moving picture decoding apparatus to perform:
selectively performing first processing or second processing;
when the first processing is to be performed, decoding information indicating whether or not a temporally neighboring block is to be referenced, the temporally neighboring block being included in a picture different from a current picture and temporally neighboring the current block;
when the second processing is to be performed, setting the information to indicate that temporally neighboring block is not to be referenced;
selecting a prediction motion vector candidate from among at least one prediction motion vector candidate; and
decoding the group of blocks using the selected prediction motion vector candidate,
wherein when the second processing is to be performed, (i) no residual is decoded for all the blocks included in the group of the blocks, (ii) the at least one prediction motion vector candidate includes a zero vector candidate having zero values for all components thereof, and (iii) the information is set to indicate that the temporally neighboring block is not to be referenced.

2. A moving picture decoding method using a candidate to decode a current block, the moving picture decoding method comprising:
selectively performing first processing or second processing;
when the first processing is to be performed, decoding information indicating whether or not a temporally neighboring block is to be referenced, the temporally neighboring block being included in a picture different from a current picture and temporally neighboring the current block;
when the second processing is to be performed, setting the information to indicate that temporally neighboring block is not to be referenced;
selecting a prediction motion vector candidate from among at least one prediction motion vector candidate; and
decoding the group of blocks using the selected prediction motion vector candidate,
wherein when the second processing is to be performed, (i) no residual is decoded for all the blocks included in the group of the blocks, (ii) the at least one prediction motion vector candidate includes a zero vector candidate having zero values for all components thereof, and (iii) the information is set to indicate that the temporally neighboring block is not to be referenced.

* * * * *